US012611569B2

(12) United States Patent
Dunkelberg

(10) Patent No.: US 12,611,569 B2
(45) Date of Patent: Apr. 28, 2026

(54) BEARING FOR AN ERGOMETER HAVING A VIBRATION UNIT, AND USE THEREOF IN A VIBRATORY ERGOMETER FOR THE UPPER AND LOWER EXTREMITIES

(71) Applicant: Brainaix Swiss AG, Willerzell (CH)

(72) Inventor: Oliver Dunkelberg, Willerzell (CH)

(73) Assignee: BRAINAIX SWISS AG, Willerzell (CH)

( * ) Notice: Subject to any disclaimer, the term of this patent is extended or adjusted under 35 U.S.C. 154(b) by 184 days.

(21) Appl. No.: 18/281,191

(22) PCT Filed: Mar. 3, 2022

(86) PCT No.: PCT/EP2022/055398
§ 371 (c)(1),
(2) Date: Sep. 8, 2023

(87) PCT Pub. No.: WO2022/189254
PCT Pub. Date: Sep. 15, 2022

(65) Prior Publication Data

US 2024/0139582 A1 May 2, 2024

(30) Foreign Application Priority Data

Mar. 12, 2021 (EP) ..................................... 21162430

(51) Int. Cl.

| | |
|---|---|
| ***A63B 22/06*** | (2006.01) |
| ***A61H 1/00*** | (2006.01) |
| ***A61H 23/02*** | (2006.01) |

(52) U.S. Cl.
CPC ......... *A63B 22/0605* (2013.01); *A61H 1/005* (2013.01); *A61H 23/0263* (2013.01); *A61H 2201/1261* (2013.01); *A61H 2203/0425* (2013.01); *A63B 2225/09* (2013.01)

(58) Field of Classification Search
CPC ............ A63B 22/0605; A63B 2225/09; A63B 21/00196; A63B 21/0059; A63B 21/225; A61H 1/005; A61H 23/0263; A61H 2201/1261; A61H 2203/0425; A61H 1/0214; A61H 1/001
See application file for complete search history.

(56) References Cited

U.S. PATENT DOCUMENTS 4,570,927 A 2/1986 Petrofsky et al.
4,958,831 A * 9/1990 Kim .................. A63B 22/0605 434/61

(Continued)

FOREIGN PATENT DOCUMENTS

CN 106618946 A 5/2017
DE 19639477 A1 4/1998

(Continued)

OTHER PUBLICATIONS

International Search Report of PCT/EP2022/055398 dated Jun. 28, 2022 [PCT/ISA/210].

*Primary Examiner* — Andrew M Kobylarz
(74) *Attorney, Agent, or Firm* — Sughrue Mion, PLLC

(57) ABSTRACT

Disclosed is a bicycle ergometer comprising at least one pedaling mechanism for a user as well as a vibration unit, characterized in that the bearing (29) of the pedaling mechanism is mounted to be pivotable about a horizontal pivot axis (45).

25 Claims, 12 Drawing Sheets

(56) References Cited

U.S. PATENT DOCUMENTS

| | | | | |
|---|---|---|---|---|
| 2009/0048075 | A1 * | 2/2009 | Quarz | A61H 23/02 482/57 |
| 2010/0234179 | A1 * | 9/2010 | Cronje | A63B 22/0605 482/4 |
| 2014/0024502 | A1 | 1/2014 | Watterson | |

FOREIGN PATENT DOCUMENTS

| | | | | |
|---|---|---|---|---|
| DE | 10241340 | A1 | 3/2004 | |
| DE | 10225323 | B4 | 7/2004 | |
| DE | 10313524 | B3 | 9/2004 | |
| DE | 102004063495 | B3 * | 4/2006 | A61H 23/02 |
| EP | 2008695 | A1 | 12/2008 | |
| EP | 2158944 | A2 | 3/2010 | |
| KR | 10-2018-0100781 | A | 9/2018 | |
| KR | 10-1941865 | B1 | 1/2019 | |
| NL | 1021619 | C2 | 4/2004 | |
| WO | 2006/069988 | A1 | 7/2006 | |
| WO | WO-2010110670 | A1 * | 9/2010 | A63G 31/16 |

* cited by examiner

A 4:1

BEARING FOR AN ERGOMETER HAVING A VIBRATION UNIT, AND USE THEREOF IN A VIBRATORY ERGOMETER FOR THE UPPER AND LOWER EXTREMITIES

CROSS REFERENCE TO RELATED APPLICATIONS

This application is a National Stage of International Application No. PCT/EP2022/055398 filed on Mar. 3, 2022, claiming priority based on European Patent Application No. 21162430.9 filed on Mar. 12, 2021.

TECHNICAL FIELD

The present invention relates to an ergometer having a vibration unit, to methods for operating an ergometer of this type, and to methods for producing ergometers of this type and to uses of ergometers of this type.

PRIOR ART

In order to be able to positively and efficiently influence the individual performance structure of rehab/geriatric patients or competitive athletes, it is necessary for as many metered external training incentives as possible to be transformed in a balanced and adapted manner to the different structural levels of the human organism. In the process, conditional (strength, stamina, speed, flexibility) as well as coordinative (neuro-motor) components should be taken into account in the application spectra of the training equipment.

A multiplicity of vibration training apparatuses has led to new training alternatives for optimizing physiological performance by reactivating pathologically degenerated functional systems, or increasing the capacity of intact functional systems, of the human structures. While the commercial use of medical vibration training (MVT) has already commenced, the scientific verification of the method is still in the stage of fundamental research.

Devices that transmit vibration energy to the user are known from a multiplicity of publications.

In this way, U.S. Pat. No. 4,570,927 discloses a device in which the legs of a paraplegic patient are moved and vibrated by a crank unit driven by a motor, for example.

NL 102 16 19 C describes an apparatus in which vibration energy is transmitted to the upper extremities by way of a handlebar.

Known from DE 102 41 340 A1 is a device in which a vibratode selectively transmits vibrations to dilated muscular structures.

A further vibration device is claimed in DE 102 25 323 B4, in which stochastic resonances are transmitted to the user by way of a mechanically complex construction.

DE 196 39 477 A1 shows a device having a seat, a handlebar and a vibration unit by way of which the feet of the user are impinged with vibrations.

A use of these five afore-mentioned devices conjointly with or as an ergometer, for example by way of a brake unit connected to the crankshaft, is not disclosed, and neither mostly are details pertaining to how the vibrations are generated.

Known from DE 103 13 524 B3 is a training apparatus in which individual or a plurality of contact points with the person undergoing training, which are able to be impinged with vibrations, are insulated in terms of vibrations by one or a plurality of damping elements so that all modules for supporting the body parts of the user are set in vibration.

Known from WO 2006/69988 A1 is a vibration ergometer in which a bottom bracket bearing is fixedly connected to a vibration plate which is set in vibration by way of two vibration motors running in opposing directions. It is disadvantageous that a non-directional vibration is generated, the amplitude of the latter decreasing depending on the mechanical load on the pedal crank or the adjustment of the ergometer brake. The connection between the pedal crank and the ergometer brake is possible exclusively by a bicycle chain with a chain tensioner in order to compensate the differences in terms of length and position between the bottom bracket bearing and the ergometer. Unpleasant noises are created as a result, and additional securing measures are required in order to prevent the chain jumping from the front chain ring.

EP 2 158 944 A2 describes a vibration ergometer having vibration which is variable in terms of amplitude. It is not disclosed herein how the vibration is specifically to be generated, and how this variation of the amplitude is to be implemented.

WO-A-2010110670 describes a stationary training and exercise apparatus for simulating the driving of bicycles, motorcycles, amphibious vehicles, aircraft and similar transport means for humans, wherein the basic construction comprises a first frame, which is supported on a floor, and a second frame outrigger which is connected to the first frame on an axle, whereas the second frame is able to be rotatably tilted relative to the first frame, and wherein the tilt is able to be controlled by using a handlebar or a steering wheel by way of a connection between a steering column and a first frame reference.

EP-A-2008695 relates to a training apparatus which comprises a mechanism which by way of driving means is rotated by a user of the training apparatus, said driving means rotating about a rotation axis, and vibrating means by way of which the driving means can be set in vibration, wherein the vibrating means comprise an electric motor which rotates about a rotation axis, having at least one weight which is to be rotated about the rotation axis by the motor, wherein the weight is disposed eccentrically relative to the rotation axis. The electric motor is freely pivotable about a fulcrum pin which extends parallel to the rotation axis of the electric motor, wherein the fulcrum pin is disposed above the electric motor below the rotation axis of the driving means while the electric motor is pivotably connected to a support that supports the rotation axis of the driving means, wherein the support is connected to a frame of the exercise apparatus by way of spring means.

US-A-2014024502 describes a training bicycle having a base support and an upright support structure. A seat, a handlebar assembly, a pedal assembly and a resistance assembly are connected to the upright support structure. The upright support structure can be pivotably connected to the base support so as to make it possible that the upright support structure moves between different tilted positions. One or a plurality of vibration assemblies can be connected to the home bike at different locations so as to vibrate desired parts of the home bike, such as the handlebar assembly, the seat, or the pedal assembly, for instance. The vibrations are transmitted to a user while carrying out an exercise in order to provide the user with different physiological advantages.

CN-A-106618946 discloses a rehabilitation training bed for training the lower extremities. The rehabilitation training bed comprises a bed body, a training system for the lower extremities which can move in the horizontal direction relative to the bed body and is disposed on the bed body, and comprises a trainer for the lower extremities and a position-adjustment mechanism for the trainer for the lower extremities, wherein the position-adjustment mechanism for the trainer for the lower extremities is assembled on the bed body, and the trainer for the lower extremities is fixedly connected to an end of the position-adjustment mechanism for the trainer for the lower extremities. According to the diagram, the issues that an available rehabilitation bed is standalone in the training mode, is large in size, large in terms of the occupied space, and the like, can be solved.

KR-A-20180100781 relates to an intelligent driving simulator which is linked to virtual reality and makes it possible for a user to experience virtual reality while said user moves in the same way as he/she would actually drive a bicycle, a motorcycle, a vehicle and the like in a virtual space. The virtual reality-linked intelligent driving simulator comprises: a frame unit for providing a seat for a user; a tilting plate for supporting the frame unit, which tilting plate is to be rotated toward the front and toward the rear; a front/rear tilt implementation unit for rotating the frame unit in the forward and rearward direction relative to the tilting plate unit according to a signal which relates to an inclination of a road surface of a virtual driving space toward the front and the rear, said signal being input externally; a base plate unit for supporting the tilting plate unit that is to be rotated toward the left and the right; and a left/right tilt implementation unit for mounting the left and right floor areas of the tilting plate unit by a drive shaft which is supported so as to be rotated horizontally on the base plate unit, and a multiplicity of cams which are integrally coupled to said drive shaft and are rotated, and for adjusting tilting of the tilting plate unit toward the left and right by driving according to a signal that relates to an inclination of the road surface of the virtual driving space toward the left and the right and is input externally. In this way, it is possible to impart a realistic driving sensation in a virtual driving space reality in that different driving environments and driving postures are implemented as if a user were actually driving.

SUMMARY OF THE INVENTION

All previously mentioned ergometer systems are based on the principle of positioning the user conjointly with the training means used on a vibrating plate. All components used for supporting the person undergoing training exert vibration energy on the body parts in contact with the components, or on the corresponding body segments, respectively. This results in whole body vibrations (WBV) which to some extent exceed the critical occupational health values according to DIN ISO 2631. The resonance conflicts reduce the application duration with a resultant (temporally limiting) minimization of efficiency. The constructive insulation of the features of the MVT apparatuses to the uniform neuro-motoric stimulation of the intramuscular coordination, while focusing on the conditional strength component, leads to a deficit in terms of a wide conditional-coordinative multifunctionality of the WBV. The MVT products in the prior art cover only a selective partial aspect of the training therapy; a holistic training concept cannot be implemented with these devices. A combination with conservative training apparatuses is mandatory (e.g. with cardiological apparatuses in the warm-up/cool-down phase, or supplementary mechanical resistance training).

It is an object of the present invention to provide a mounting for an ergometer having a vibration unit, wherein an optimal mounting of the bottom bracket bearing for the vibrations is thus provided, in which vibrations the amplitude as well as the frequency are to be adjustable, in that the vibration acts substantially only in one, preferably vertical, direction, the amplitude of the vibration is substantially independent of the load on the vibration unit, and vibration frequencies of up to 50 Hz are to be achieved. A further object of the present invention lies in the use of the mounting according to the invention in a vibration ergometer for the lower and upper extremities.

The present invention correspondingly relates to an ergometer, in particular a bicycle ergometer, having at least one pedal device for a user, and having a vibration unit as claimed in claim 1.

The present invention relates primarily to a bicycle ergometer. However, the concepts described herein can be used in an analogous manner in an ergometer for the upper extremities, i.e. a hand ergometer. It is also possible for the present invention to be used in a combined bicycle and hand ergometer in both crank devices. If the proposed technology is used in a hand ergometer, the bottom bracket bearing consequently used is then of course not a bottom bracket bearing in the actual sense but a crank bearing for such a hand ergometer, and the pedal device mentioned hereunder is in this instance not a pedal device but a rotation device for the hands.

The invention is characterized in particular in that the bearing of the pedal device is mounted so as to be pivotable about a horizontal swivel axle, wherein the vibration about this swivel axle preferably acts substantially only in one, preferably vertical, direction.

As a result of this mounting, the vibrations can be generated selectively about this horizontal swivel axle on the bottom bracket bearing, and also then act only at this location.

According to a first preferred embodiment, a brake is disposed preferably substantially at the same level as the pedal device, which brake by way of a force transmission element, preferably in the form of a chain, of a timing belt or a V-belt, is coupled to the pedal device. Moreover preferably, the bearing of the pedal device is mounted so as to be pivotable about a horizontal swivel axle disposed at the level of an axle of the brake.

In general, the swivel axle is preferably disposed horizontally.

The swivel axle mounting of the bearing can be provided by a substantially fork-shaped construction in which the fork ends of the arms are mounted so as to be rotatable about the swivel axle, and the opposite converged arms are connected to the bearing, preferably in that the converged region forms a bearing receptacle for the bearing of the pedal device.

Furthermore preferably, the swivel axle can be disposed in such a manner that the pivoting movement at the location of the bearing is permitted substantially exclusively in the vertical direction.

The vibration unit preferably has at least one main shaft which is driven directly or indirectly by a motor and which has an eccentric disk fastened thereto, wherein the eccentric disk is rotatably coupled to a con rod.

Furthermore preferably, the con rod by way of a con rod head disposed opposite one of the eccentric disk thereof transmits the vibrations to the bearing of the pedal device such that the vibrations bear on this bearing substantially exclusively in the vertical direction. In conjunction with the bearing according to the invention, the vibrations in this way can optionally be selectively brought to bear on the bottom bracket bearing.

A further preferred embodiment is characterized in that the vibration unit has at least one main shaft which is driven directly or indirectly by a motor and which has an eccentric disk fastened thereto, wherein the eccentric disk is rotatably coupled to a con rod, and the vibration unit is disposed below the bearing, and in that the con rod head is coupled directly to the bearing, preferably forms a bearing shell for the bearing, and the con rod solely and without any further guide supports substantially the entire load directed vertically downward on the bearing.

In general, the axis of the main shaft is preferably disposed parallel to the axis of the bearing.

A further preferred embodiment is characterized in that the bearing of the pedal device is mounted in a vertical linear guide having a linear slide, wherein the linear slide at the top is fixedly connected to the bearing, and at the bottom is connected to the con rod head, wherein the axis of the main shaft preferably runs parallel to the axis of the bearing.

Furthermore, a floor plate can be disposed, the main shaft and preferably also the motor being disposed therebelow and the pedal device being disposed thereabove, wherein a recess through which the con rod passes and by way of which the con rod head thereof is coupled directly to the bearing can be provided in the floor plate.

The vibration unit preferably has at least one main shaft which is driven directly or indirectly by a motor and which has an eccentric disk fastened thereto, wherein the eccentric disk is rotatably coupled to a con rod, and the vibration unit is disposed below the brake, preferably above a floor plate, and wherein the coupling of the con rod to the bearing is preferably implemented by at least one strut which runs obliquely upward and connects the con rod head directly or indirectly to the bearing, and wherein this strut is furthermore preferably rigidly connected to the swivel axle mounting.

A further preferred embodiment is characterized in that the vibration unit has at least one main shaft which is driven directly or indirectly by a motor and which has an eccentric disk fastened thereto, wherein the eccentric disk is rotatably coupled to a con rod, and a further eccentric disk by way of which a counterweight is set in compensating vibration is disposed on the main shaft, wherein this further eccentric disk is preferably disposed on the main shaft by way of eccentricity which is counter to the eccentric disk for driving the con rod.

The further eccentric disk preferably drives a further con rod which is rotatably mounted on the further eccentric disk and is coupled to a counterweight which is set in vibration substantially in the same direction as the vibration device on the bearing but with an action compensating the vibration on the bearing, preferably in that the vibration on the counterweight is offset by 180° in relation to the vibration on the bearing.

Here, a brake is disposed preferably substantially at the same level as the pedal device, which brake by way of a force transmission element, preferably in the form of a chain, of a timing belt or of a V-belt, is coupled to the pedal device, and the counterweight is mounted so as to be pivotable about a horizontal swivel axle mounting preferably disposed at the level of an axle of the brake, wherein the swivel axle is preferably disposed such that the counterweight in the region of the bearing performs the pivoting movement substantially exclusively in the vertical direction, wherein the counterweight in the region of the bearing preferably has a weight head, and this weight head furthermore preferably at least partially encompasses the bearing region at the top and the bottom in the shape of a fork.

Alternatively or additionally to such a compensation device with a counterweight, the vibrations on the components that are actually not to be set in vibration can also be prevented in that the ergometer is set up on a weighted plate, typically with a weight of at least 50 kg, preferably of more than 100 kg, for example provided by metal plates, sand containers, water containers and/or stone elements which are provided, for example, in a frame which is mounted so as to be height-adjustable on the platform. Such a frame can preferably be adjusted in terms of height and/or leveled, optionally even electrically, and by way of rollers be displaced to the desired location (said rollers being able to be lowered only for the displacement, for example). The plate can additionally contain damping elements; damping elements of this type are preferably provided in the corners of such a frame and/or of the weighted plate, and/or damping mats for bearing on the frame or on frame elements may be provided. Damping mats having a fine cellular elastomeric structure with enclosed gas volumes, for example based on polyetherurethane with a thickness in the range from 10-30 mm, are particularly suitable. A mechanical high-pass filter which largely prevents the vibrations on the floor on which the apparatus is set up, as well as on components of the ergometer that are not to be set in vibration, can be provided with such a construction. The high-pass filter effectively filters out in particular vibrations below 25 Hz, preferably below 20 Hz.

The vibration unit can have at least one main shaft which is driven directly or indirectly by a motor and which has an eccentric disk fastened thereto, wherein the eccentric disk is rotatably coupled to a con rod, and the eccentric disk and/or an optionally present further eccentric disk are/is mounted on the main shaft so as to be displaceable and adjustable along a direction perpendicular to the rotation axis of the main shaft, wherein this mounting is preferably implemented by a gate guide in which at least one adjustment element when displaced along the axis of the main shaft causes a displacement of the eccentric disk along a direction perpendicular to the rotation axis of the main shaft.

The at least one adjustment element can be mounted in a recess or through-opening in the main shaft so as to be adjustably displaceable by way of actuating means, and a gate in or on the adjustment element can adjust the eccentricity of the eccentric disk by interacting with a sliding block on the eccentric disk.

An eccentric disk for generating the desired vibration, and a further eccentric disk for the counterweight, can further be mounted on the main shaft, and either an adjustment element by way of which the eccentricity of both eccentric disks can be adjusted in a correlated manner so as to be offset by 180° can be provided, or two individual adjustment elements by way of which the eccentricity of the disks can be individually adjusted can be provided for the respective eccentric disk.

An ergometer of this type is typically provided to be operated at a frequency of 1-50 Hz with a vibration amplitude at the bearing in the range from 1-10 mm, preferably in the range from 3-7 mm, is configured preferably at a load in the range from 50-500 W, in particular in the range from 100-300 W.

The present invention furthermore relates to the use of an ergometer as described above for therapeutic and/or form-building therapy, wherein frequencies at the bearing are preferably adjusted in the range from 5-50 Hz, preferably in the range from 7-25 Hz, and/or with amplitudes in the range from 1-10 mm, preferably 3-7 mm.

Further embodiments are set forth in the dependent claims.

BRIEF DESCRIPTION OF THE DRAWINGS

Preferred embodiments of the invention will be described hereunder by means of the drawings which serve only for the purpose of explanation and are not intended to be limiting.

In the drawings.

DESCRIPTION OF PREFERRED EMBODIMENTS

Figure 1:
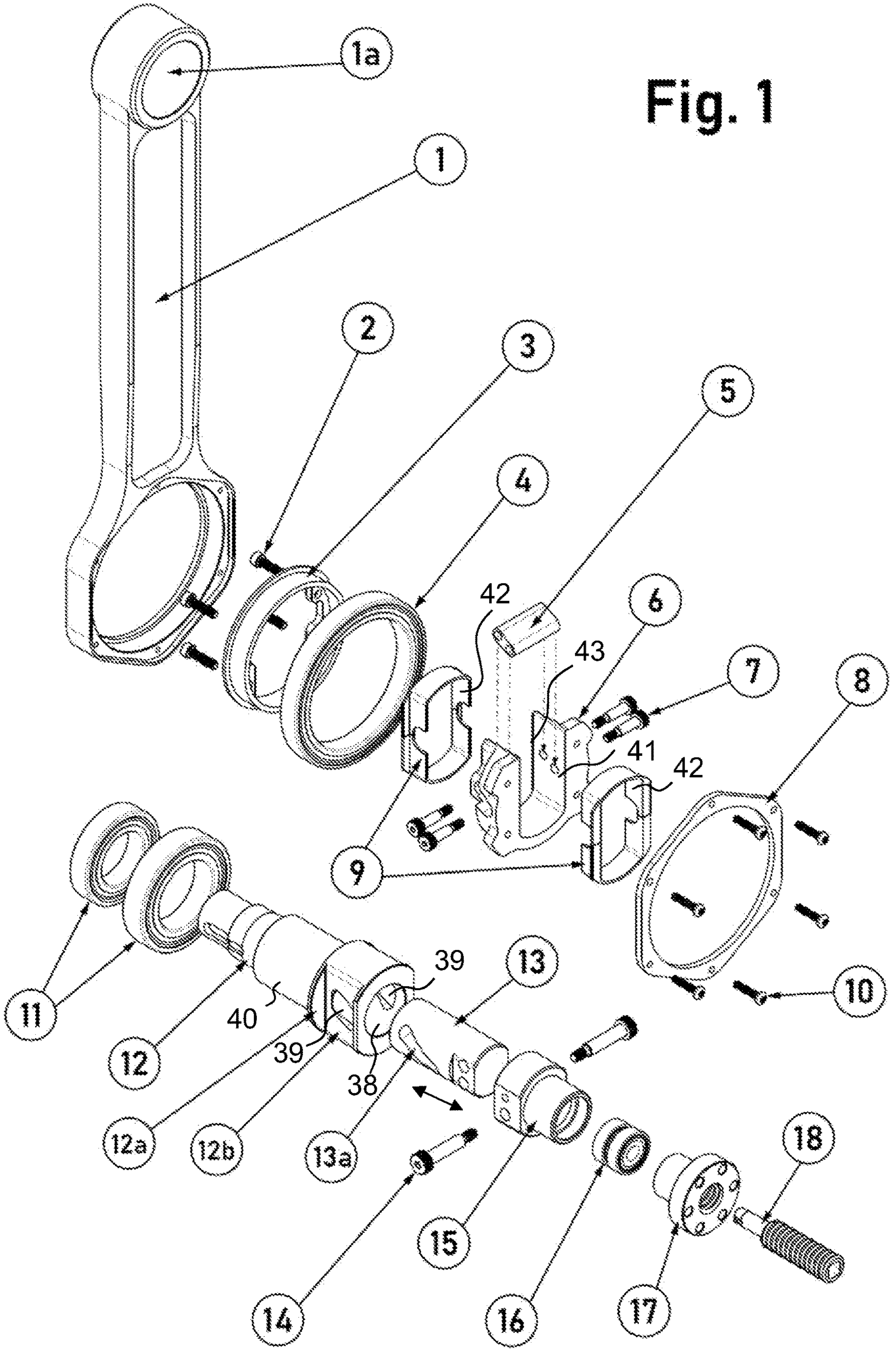
FIG. 1 shows substantial elements of a vibration unit for an ergometer according to a first embodiment in an exploded illustration.

FIG. 1 shows substantial elements of a vibration unit in an exploded illustration. The actual main shaft 12 is mounted by two bearings 11 and is set in rotation by a motor (not illustrated). The coupling to the motor can take place either directly or indirectly, for example by way of a V-belt. The motor is preferably a servomotor with an output in the range from 300-1600 W. The main shaft 12 herein is structured and on the left side 40 possesses a region in which said main shaft 12 is mounted by said bearings 11. The two ball bearings 11 serve for mounting the main shaft 12 to the bearing housing 19 and prevent an axial displacement of the main shaft 12. A shoulder face 12*a* follows on the right-hand side. This shoulder face 12*a* prevents an axial displacement of the eccentric disk 6, illustrated above on the right, and thus of the entire con rod 1. The eccentric disk 6 is placed displaceably on the sliding face 12*b* of the main shaft. The shell sleeves 9 are held in a form-fitting manner in the eccentric disk 6 and enable the eccentric adjustment of the eccentric disk 6 out of the rotation axis of the main shaft 12. The force transmission of the rotation of the main shaft 12 to the eccentric disk 6 takes place by way of the sliding face 12*b* by way of the shell sleeves 9 and thus onto the con rod 1. The eccentric disk 6 here does not bear directly on the sliding faces 12*b* of the main shaft, but the shell sleeves 9 are located therebetween, said shell sleeves 9 potentially being in two parts, as illustrated here, or else in one part. The contact faces 41 on the internal side of the eccentric disk 6 are correspondingly in contact with the external side of the shell sleeves 9, and the contact faces 42 of the latter on the internal side are in turn in contact with the sliding face 12*b* of the main shaft 12.

The shell sleeves 9 are preferably made from a material with frictional properties, for example from a plastics material with frictional properties (e.g. PTFE), and the main shaft 12 is made from metal, in order to achieve an optimal frictional pairing on the sliding face 12*b*.

The eccentric disk 6 in the axial recess 43 thereof possesses a sliding block 5 which runs so as to be tilted and transversely to the axis of said recess 43 and which determines the deflection of the eccentric disk 6 and thus the stroke of the con rod 1. The sliding block 5 bridges the recess 43 and is held by the screws 7. The fitting screws 7 fix the sliding block 5 in the eccentric disk 6 not only in a force-fitting but also in a form-fitting manner. For mounting the con rod 1, a ball bearing is fastened on the eccentric disk 6 by way of the bearing ring 3. To this end, the ball bearing by way of the bearing ring 3 is screwed to the eccentric disk by way of the screws 2. A clamping ring 8 which fixes the outer ring of the ball bearing 4 in a force-fitting manner to the con rod 1 by way of the screws 10 is provided on the other side. The screws 10 by way of the clamping ring 8 clamp the ball bearing 4 to the con rod 1.

The forces of the con rod 1 are transmitted to the main shaft 12 by way of the eccentric disk 6 by way of the shell sleeves 9, and transmitted to the bearing housing 19 by way of the bearing assembly 11. The con rod head 1*a* serves for receiving a bearing for the movable fixing to the linear unit or the swing arm (see further below).

A stud-shaped adjustment element 13 engages in a displaceable manner axially in an axial blind bore 38 of the main shaft 12. The adjustment element 13 by way of the fitting screws 14 is connected in a force-fitting and form-fitting manner to the bearing receptacle 15. The bearing receptacle 15 receives the bearing assembly 16 in the form of two ball bearing rings. A trapezoidal thread nut 17, which is mechanically connected (=secured against rotation) to the bearing housing 19 (not illustrated in FIG. 1) sits on this bearing assembly 16. 6 bores for the screw fitting to the bearing housing 19 are also illustrated in FIG. 1. The bearing assembly 16 is adjustable without play in the axial direction, and is fastened to the trapezoidal spindle 18 by way of the shaft clamping nut 20 and the locking ring 21 (neither illustrated in FIG. 1, cf. FIGS. 2*a* and 2*b*). The trapezoidal spindle 18 moves the adjustment element 13 in the axial direction so as to vary the stroke of the con rod 1. Due to the bearing assembly 16, the trapezoidal spindle 18 does not rotate conjointly with the main shaft 12.

The adjustment element 13 is preferably made from a material with frictional properties, for example from a plastics material with frictional properties (e.g. PTFE), and the sliding block 5 is made from metal in order to achieve an optimal frictional pairing.

A gate opening in the form of a cut-out area 13*a* runs transversely in the adjustment element. This cut-out area possesses a substantially identical width to the thickness of the sliding block 5 and is however substantially longer. Said cut-out area is in alignment with the larger opening 39 when the adjustment element 13 is pushed into the blind bore 38. In other words, the sliding block 5 penetrates the openings 39 and 13*a*. The cut-out area 13*a* is thus part of the adjustment element 13. The sliding block 5 is positioned in the cut-out area 13*a*; the deflection of the eccentric disk 6 in a form-fitting manner is achieved by way of the planar faces of the sliding block 5 and of the cut-out area 13*a* of the adjustment element 13.

In this way, the eccentric disk 6 is eccentrically mounted on the main shaft 12. The lower ring of the con rod 1 in turn is rotatably mounted on the eccentric disk 6 by way of the bearing ring 4. When the main shaft 12 rotates, the eccentric disk 6 thus performs an eccentric movement which is transmitted to the lower ring of the con rod 1 and in this way is converted to a translation or oscillation at the con rod head 1*a*. The frequency of these oscillations are determined by the rotational frequency of the main shaft 12, and thus by way of the frequency of the motor that drives this shaft. The amplitude of the oscillation can be adjusted by the trapezoidal spindle 18. The further the adjustment element 13 is pushed into the blind bore 31, the more the eccentric disk 6 is displaced out of the axis of the main shaft 12 by way of the sliding block 5, and the larger the amplitude of the eccentricity and thus also of the movement at the con rod head 1*a*. The vibration generated at the con rod head 1*a* can thus be finely adjusted and controlled in terms of frequency as well as in terms of amplitude. Moreover, the con rod has a high mechanical stability and a very high directional stability, i.e. the vibrations thus generated run exactly along the direction of the con rod, i.e. the proposed device permits quasi unidirectional vibrations with an adjustable frequency and an adjustable amplitude along an exactly defined direction to be generated.

FIG. 2 in a) show the vibration unit in a sectional illustration through the axis of the shaft in a general view, and in b) shows the details according to A in a). It can be seen here how a vibration unit of this type can be disposed below a floor plate 28 which serves as the central fastening receptacle for the vibration unit. The floor plate possesses a recess 44, the con rod 1 protruding freely upward through the latter. On the lower side of the floor plate 28 there is a left bearing housing 19 for mounting the main shaft, on the one hand, and a right bearing housing 19*a* for mounting the trapezoidal thread nut 17, on the other hand.

The main shaft 12 is mounted in the right bearing housing 19 by way of the bearings 11 already mentioned above, wherein a shaft clamping nut 20 which fixedly clamps the bearing assembly 11 for the purpose of minimizing the axial and radial play of the main shaft 12 is provided for fastening purposes. There is additionally a locking ring 21 which prevents inadvertent loosening of the shaft clamping nut 20.

Figure 2A:
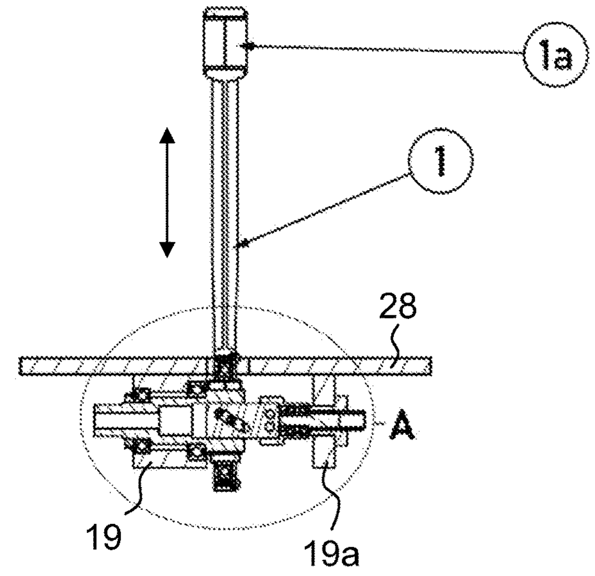
FIGS. 2*a* and 2*b* show the vibration unit according to FIG. 1 in a sectional illustration in a), in a detail fragment according to A in FIG. 2*a*) in b)
Figure 2B:
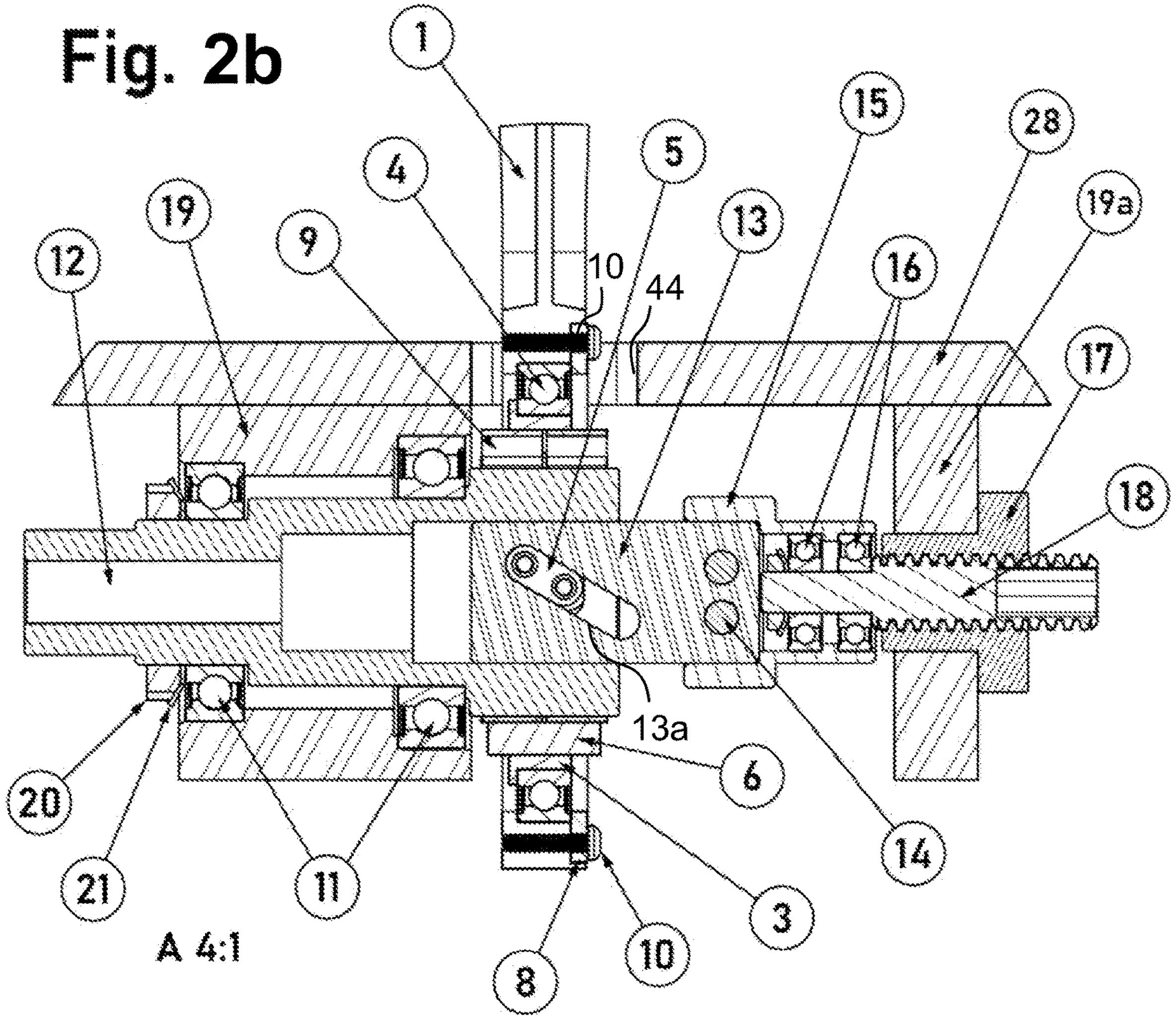

The bearing assembly 11 in FIGS. 2*a* and 2*b* is embodied as an O-bearing assembly by way of example. The force engages outside the bearing assembly 11. The radial and axial play of the main shaft 12 is adjusted as a result.

The only intended oscillation in the present invention is a deflection of the con rod head 1 which is substantially perpendicular to the floor plate.

Figure 3:
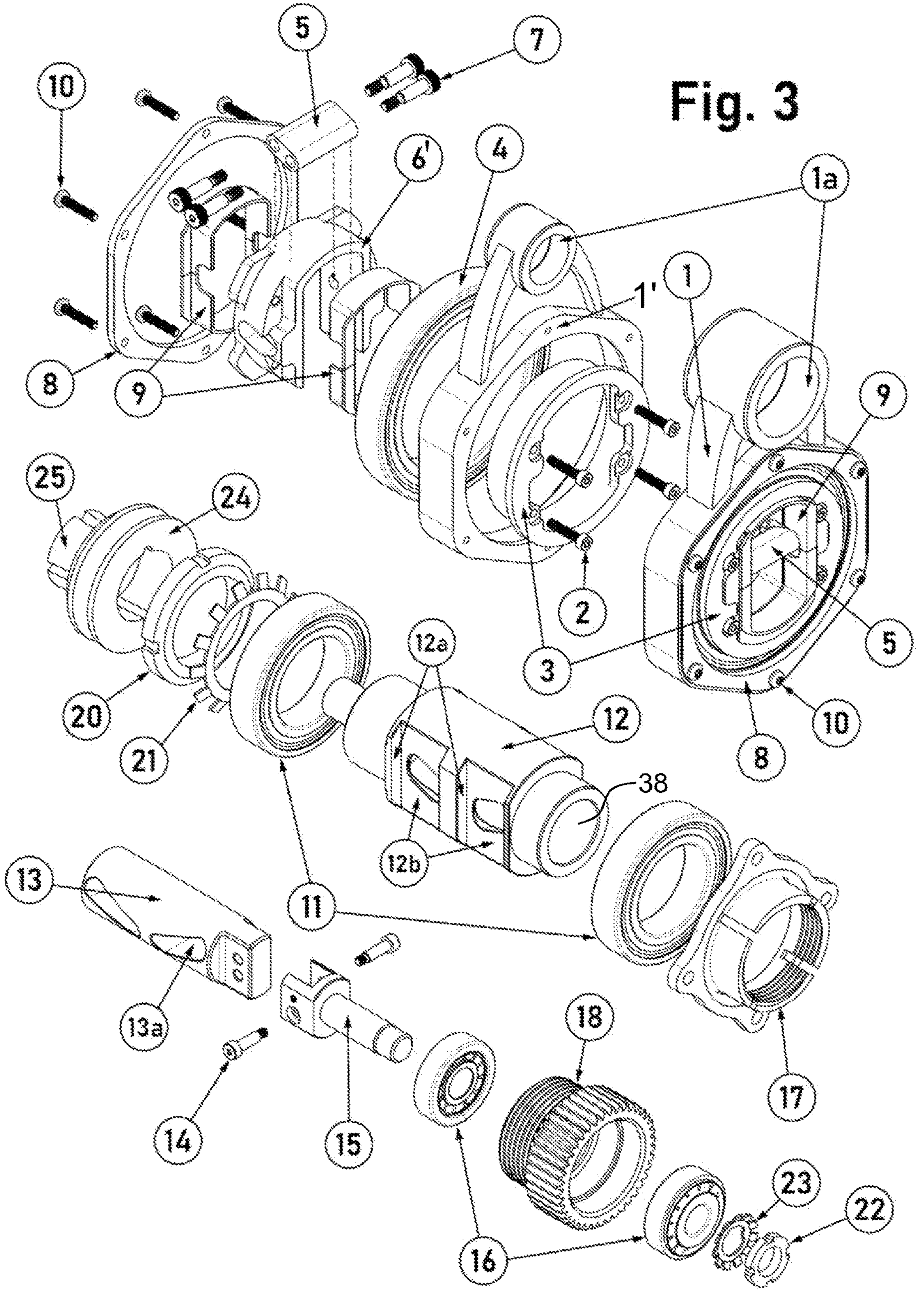
FIG. 3 shows substantial elements of a vibration unit for an ergometer according to a second embodiment in an exploded illustration.

FIG. 3 in an exploded view shows a second exemplary embodiment of a vibration unit, this time having two eccentric disks 6 which are mounted on the same shaft. In this case, two con rods 1 with a substantially shorter con rod arm are coupled to these two eccentric disks 6; one con rod serves for generating the actual effective vibration for the user, and the other con rod serves for generating the counter movement of the counterweight, which will be explained further below. The two eccentric disks 6 are disposed on the same main shaft 12, but here there is a separate sliding face 12*b* for each eccentric disk 6 on the main shaft 12, and the adjustment element 13 possesses two correspondingly assigned cut-out areas 13*a* with opposing tilt. In principle however, the two eccentric disks 6 are mounted on the main shaft 12 and controlled in terms of their eccentricity by the adjustment element 13 in an analogous manner as has already been described in the first exemplary embodiment. It is important here that the eccentricity of the two eccentric disks 6 is configured so as to be phase-shifted by 180°, this being guaranteed by the opposing tilt of the cut-out areas 13*a* and the correspondingly opposing tilt of the two sliding blocks 5 of the respective eccentric disk 6. If the adjustment element 13 is displaced in the recess 38 of the main shaft 12 by activating the trapezoidal spindle 18, which in this case is fastened by a locking ring 23, which prevents inadvertent loosening of the shaft clamping nut 22, and a shaft clamping nut 22 which fixedly clamps the bearing assembly 16 in the bearing receptacle 15, so as to mount the trapezoidal thread spindle 18 axially and radially without play, the one eccentric disk is quasi offset in a first direction, and the other eccentric disk is quasi offset in the opposite direction from the main axis. This leads to a phase shift of the eccentricity of the two eccentric disks 6 by 180°, specifically in a completely correlated manner, i.e. the adjustment by the single adjustment element 13 with the opposing tilts of the cut-out areas 13*a* automatically leads to there being exactly a phase shift of 180°, independently of the adjusted amplitude of the vibration. It is ensured in constructive terms in this way that the optimal phase shift of the two con rods is present at all times so that the compensation by the counterweight is provided in an optimal manner at any adjustment and at any vibration amplitude.

The second exemplary embodiment differs from the first exemplary embodiment inter alia also in that the main shaft 12 is coupled in a somewhat different way. Here, there is additionally a V-belt pulley 24 which serves for coupling a servomotor to the main shaft by way of a V-belt. The V-belt pulley 24 is fastened by a clamping nut, for example in the form of a taper-lock bush.

The second embodiment thus differs from the first embodiment in that compensation of unintended oscillations is possible. The term unintended oscillations is understood to mean in particular the oscillation of the floor plate 28 that is directed counter to the intended oscillation, as well as other oscillation which is not directed perpendicularly to the floor plate 28. The unintended oscillations are created by the eccentric which has not been balanced, wherein the imbalance of the eccentric is significantly caused by the adjustability of the con rod and the construction of the latter, which cannot be statically balanced due to the amplitude modulation of the stroke.

Figure 4:
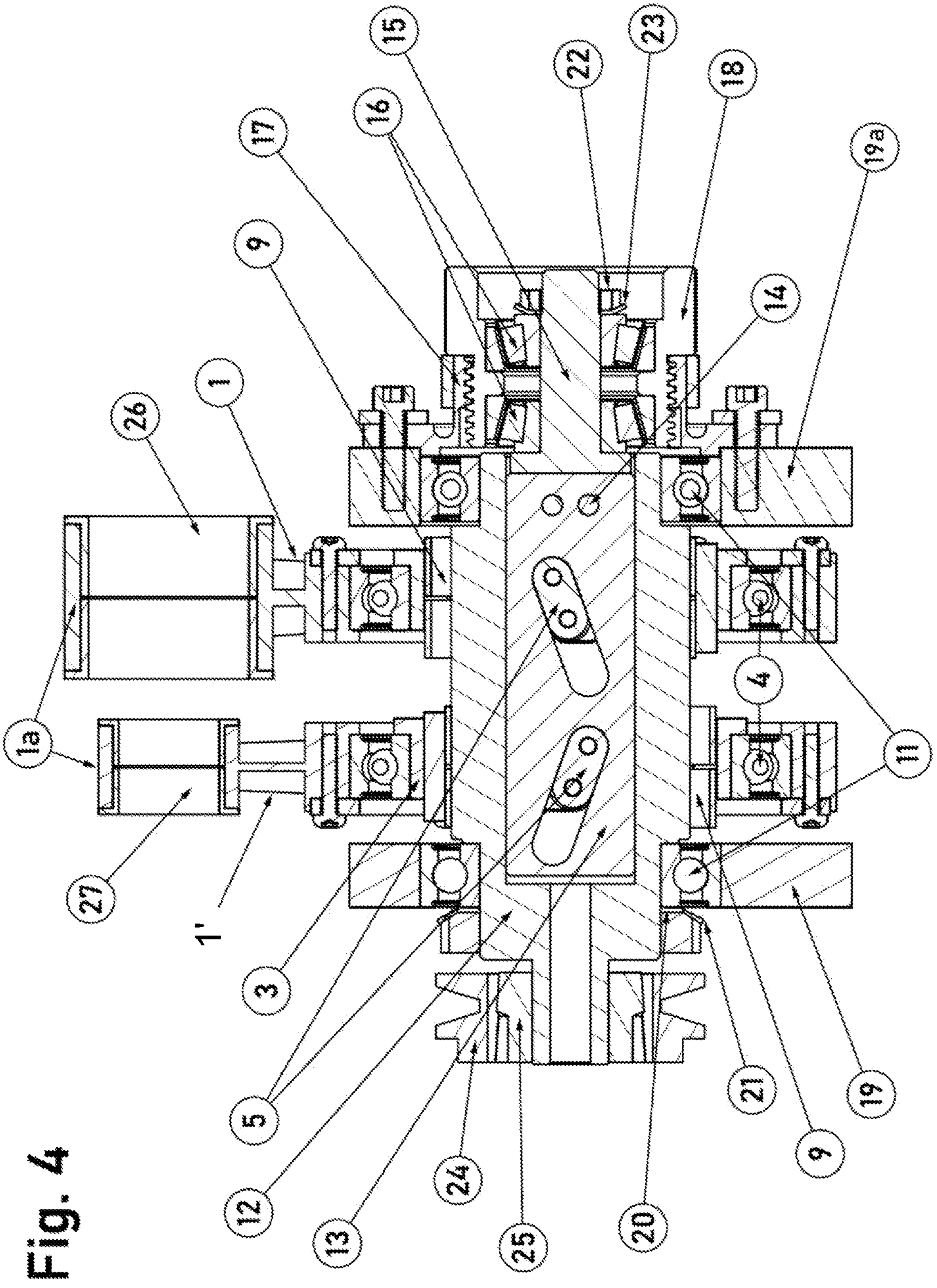
FIG. 4 shows the vibration unit according to FIG. 3 in a sectional illustration.

FIG. 4 shows the second exemplary embodiment in a sectional illustration; it can be seen here inter alia how the two con rods are mounted parallel next to one another on the same main shaft 12 by way of the two eccentric disks, how the V-belt pulley 24 for coupling a servomotor projects on the left side, and how the trapezoidal spindle for the adjustment of the eccentricity projects on the right side. It can thus be seen that a solution which is extremely compact in terms of construction is provided, in which the two con rods that absorb high loads are mounted in a stable manner.

The bearing face of the con rod head bearings 26 in FIG. 4 is designed to be larger than the con rod head bearings 27, so as to absorb the higher forces which arise under load during operation (for example under the influence of body weight).

The adjustment element 13 extends the respective sliding blocks for the crank, or for the compensation weight, in opposite directions. The two eccentric disks have to be axially rotated by 180° in relation to one another in order to be able to be deflected in opposite directions. This offset arrangement of the eccentric disks 6 can be better seen in FIG. 5.

Figure 5:
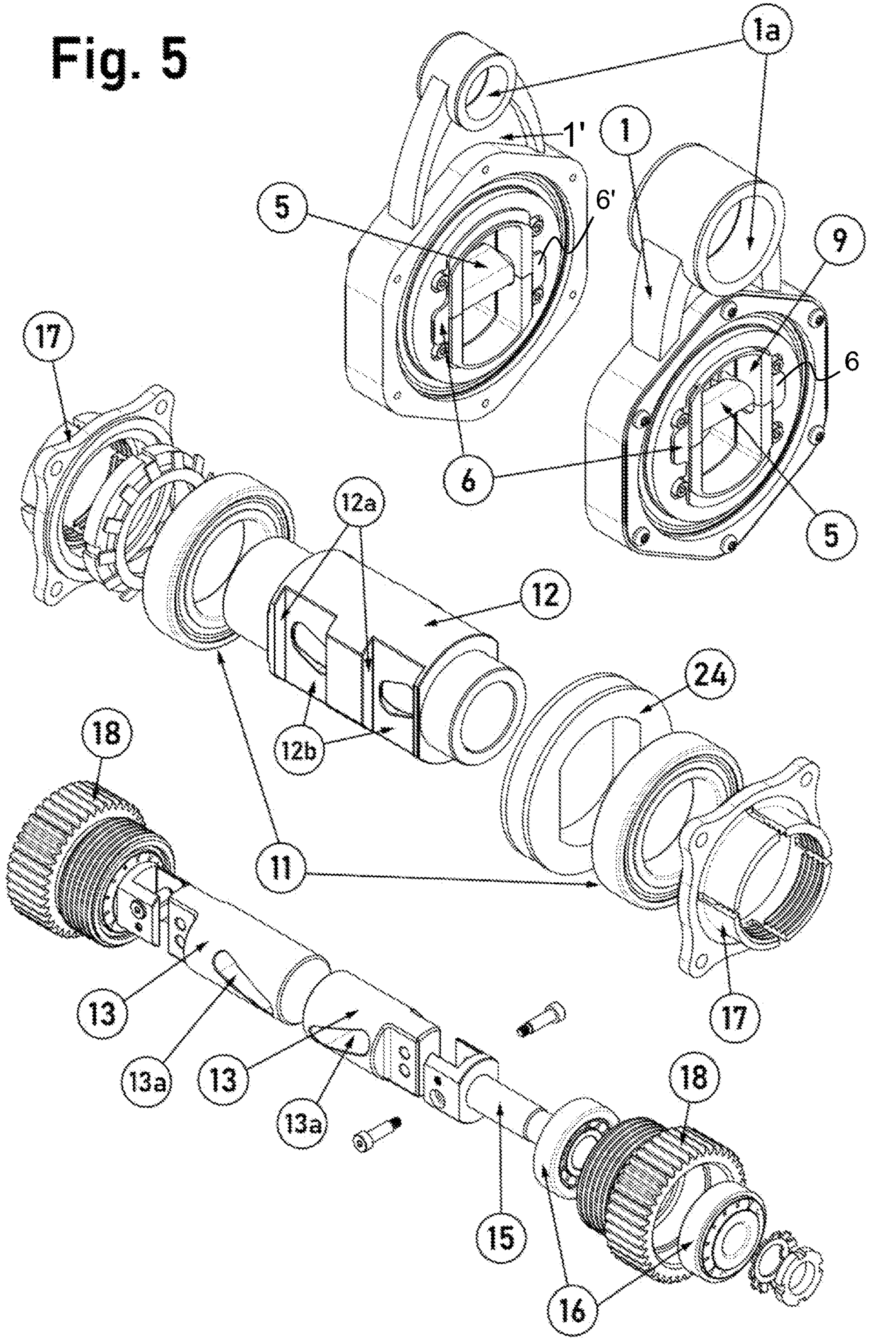
FIG. 5 shows substantial elements of a vibration unit for an ergometer according to a third embodiment in an exploded illustration.

FIG. 5 in an exploded view shows a third exemplary embodiment of a vibration unit, which in contrast to the second exemplary embodiment is provided so that the eccentricity of the two con rods 1, or of the assigned eccentric disks, can be individually adjusted for both, respectively. To this end, the main shaft 12 is no longer mounted on one side and on the other side open for control by way of the adjustment element 13, but the main shaft is mounted at both ends by way of the bearing rings 11, as can be seen in particular by means of FIG. 6, a sectional illustration. The main shaft is no longer configured with a blind bore but with an axial through-opening, such that individual adjustment elements 13 for the adjustment of the eccentricity of each eccentric disk 6 can be inserted from both sides now. Accordingly, there are trapezoidal spindles 18 on both sites, which control the respectively assigned adjustment element 13. The two adjustment elements however again possess cut-out areas 13*a* with opposing tilt such that the eccentricity can in principle be adjusted individually but still so as to be phase-shifted by 180°. It is ensured in this way that the phase shift is always 180°, but that the amplitude of the vibration can be set differently for the two con rods. In this way it is possible for the vibration compensation by the counterweight to be adjusted even more finely, and to be adjusted in particular to environmental parameters or user parameters such that the compensation is always optimally guaranteed.

The third embodiment thus differs from the second embodiment in that the amplitudes of both con rods can be controlled in a mutually independent manner. According to this embodiment, compensation of unintended vibrations can take place by oscillation balance. The substantial difference in relation to the embodiment according to FIGS. 3 and 4 lies in that the adjustment element 13 is configured in two parts. Both adjustment elements 13 require a separate O-mounting and actuation by way of motors. The left trapezoidal spindle 18 controls the deflection of the compensation weight; the right trapezoidal spindle 18 controls the deflection of the crankshaft. The drive of the main shaft 12 in this embodiment is performed centrically between the two con rods 1.

The adjustment of the compensation can also take place manually, but it is also possible that the trapezoidal spindle or the plurality of trapezoidal spindles is/are actuated by way of a further actuator. It is thus possible, for example, for such an actuator to be actuated by feedback control, for example by way of a vibration sensor or else a plurality of vibration sensors, and a corresponding control unit. It is thus in particular also possible for such a control to be feedback-controlled in a self-teaching algorithm such that the vibrations measured by the vibration sensors are minimal where said vibrations are not to arise (for example on the floor plate), and are maximal or exactly in the desired range where said vibrations are to arise (for example at the bottom bracket bearing).

Figure 6:
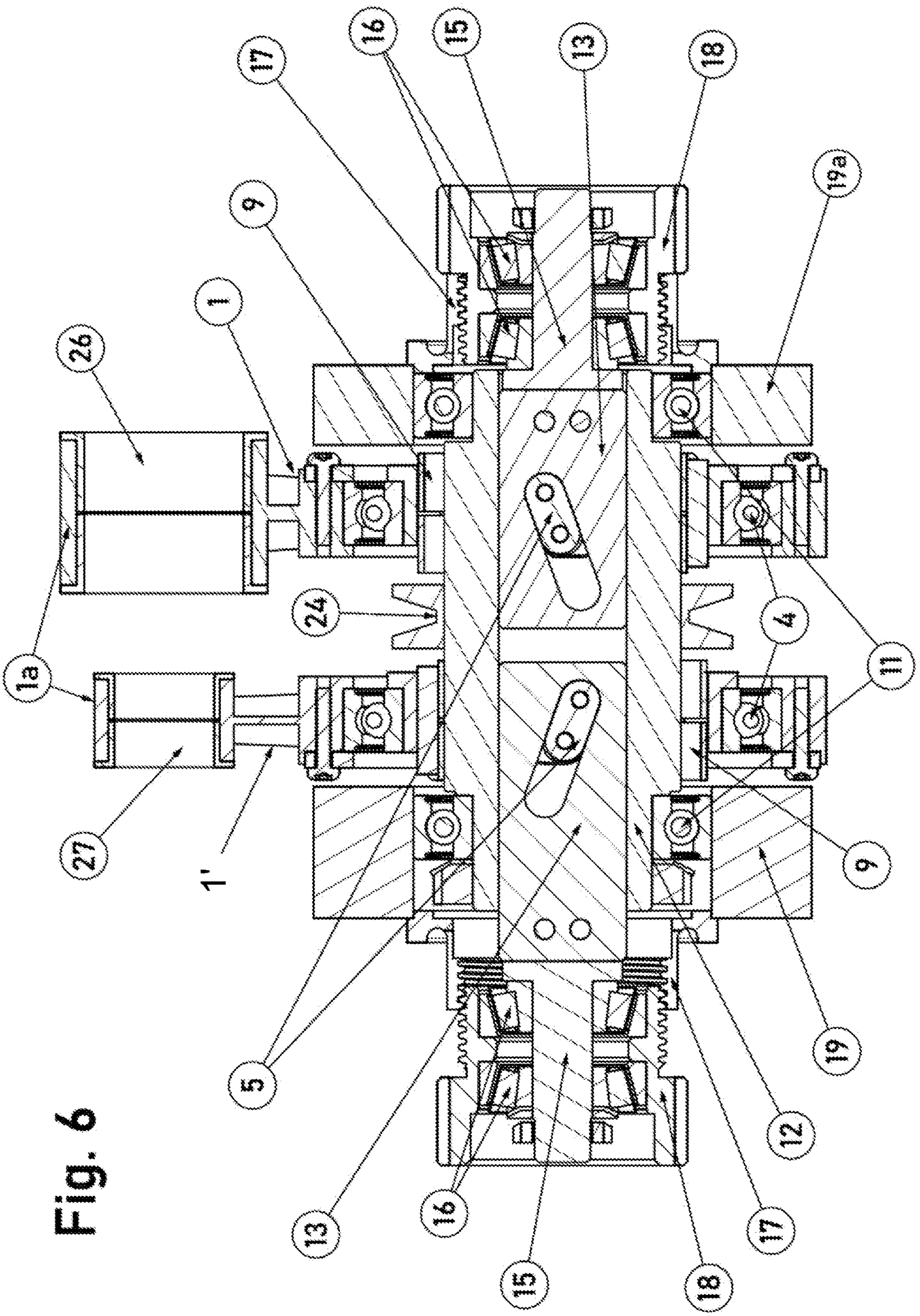
FIG. 6 shows the vibration unit according to FIG. 5 in a sectional illustration.

FIG. 6 is a sectional drawing of the exploded drawing 5. The length of the two adjustment elements 13 differs: a con rod stroke of zero is illustrated in FIG. 6. In order for the stroke to be varied, the right adjustment element 13 is moved toward the right, and the left adjustment element 13 is likewise moved toward the right byway of a rotation of the trapezoidal spindle 18; as a result, the deflection of the eccentric disks changes, said deflection can be seen in FIG. 6 on account of the different position of the play of the shell sleeves 9 (the right shell sleeves show the play at the top, the left at the bottom).

Figure 7C:
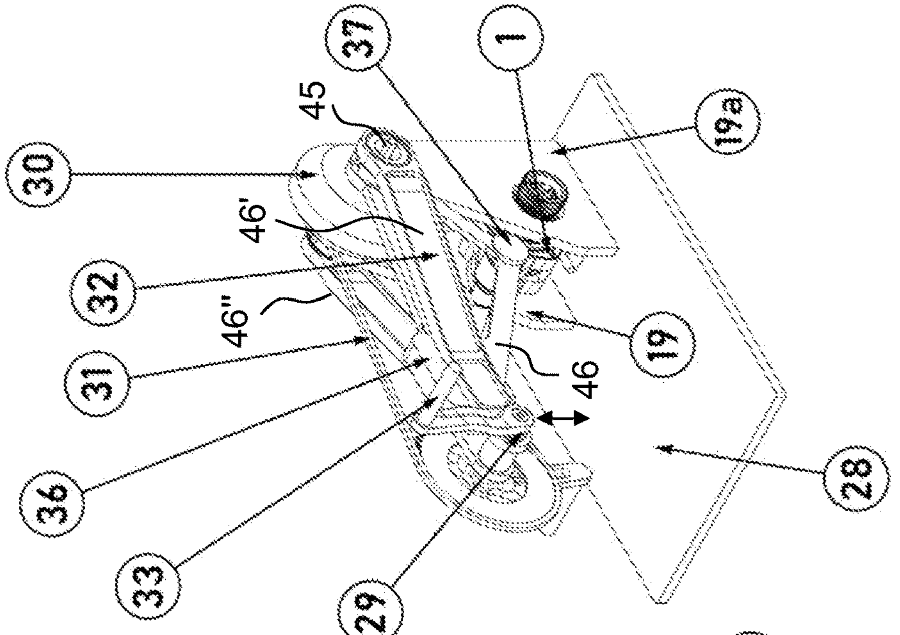
FIGS. 7*a* to 7*c* show different arrangements of the vibration unit, wherein illustrated in a) is an embodiment in which the bottom bracket bearing by way of a swing arm is mounted directly from below by the con rod, in b) is an embodiment in which the bottom bracket bearing is mounted without a swing arm in a linear mounting to which the vibration unit is coupled from below, and in c) is an embodiment in which the vibration unit is disposed below the brake, the bottom bracket bearing is mounted by way of a swing arm, and a counterweight is provided.
Figure 7B:
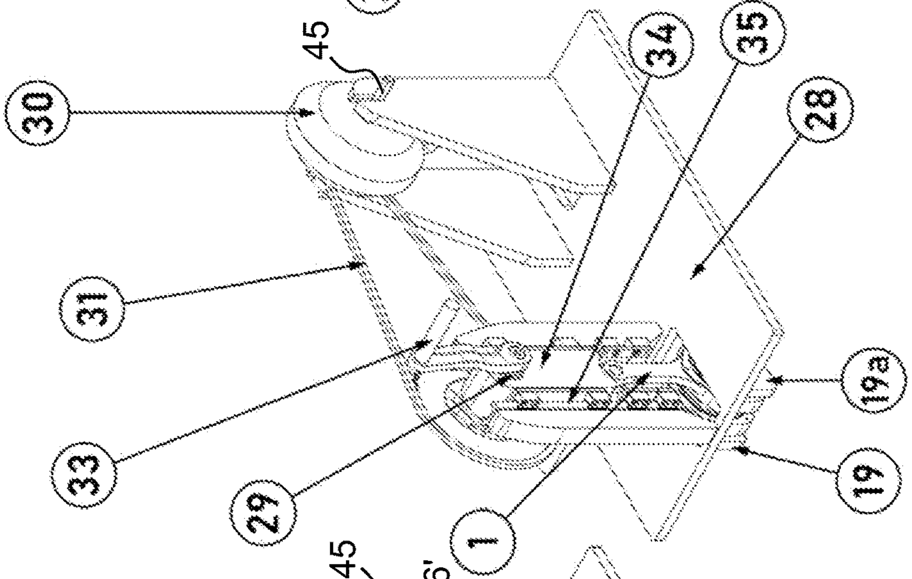
Figure 7A:
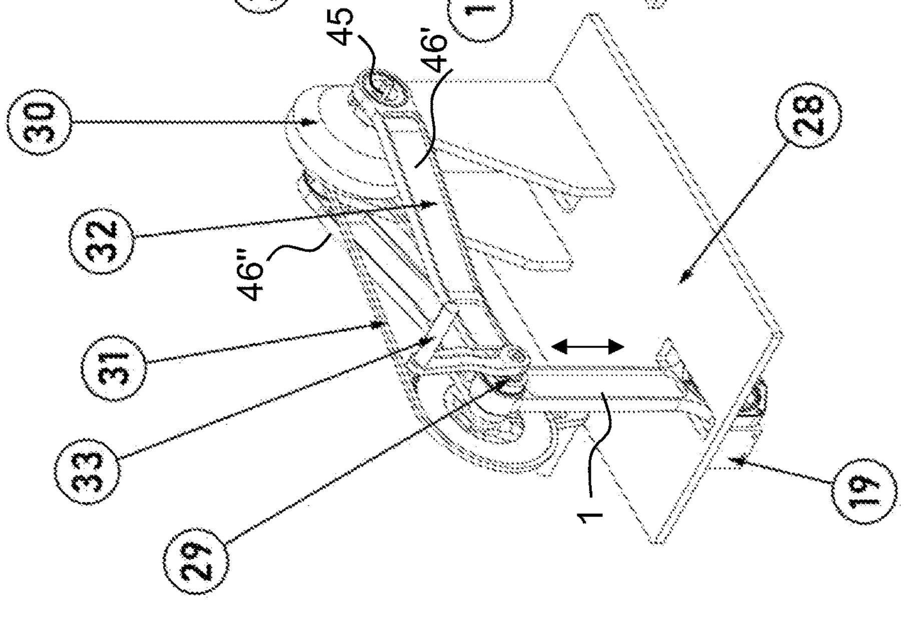

FIG. 7*a* to 7*c* now show different possibilities of disposing a vibration unit of this type on a (bicycle) ergometer.

Figure 8:
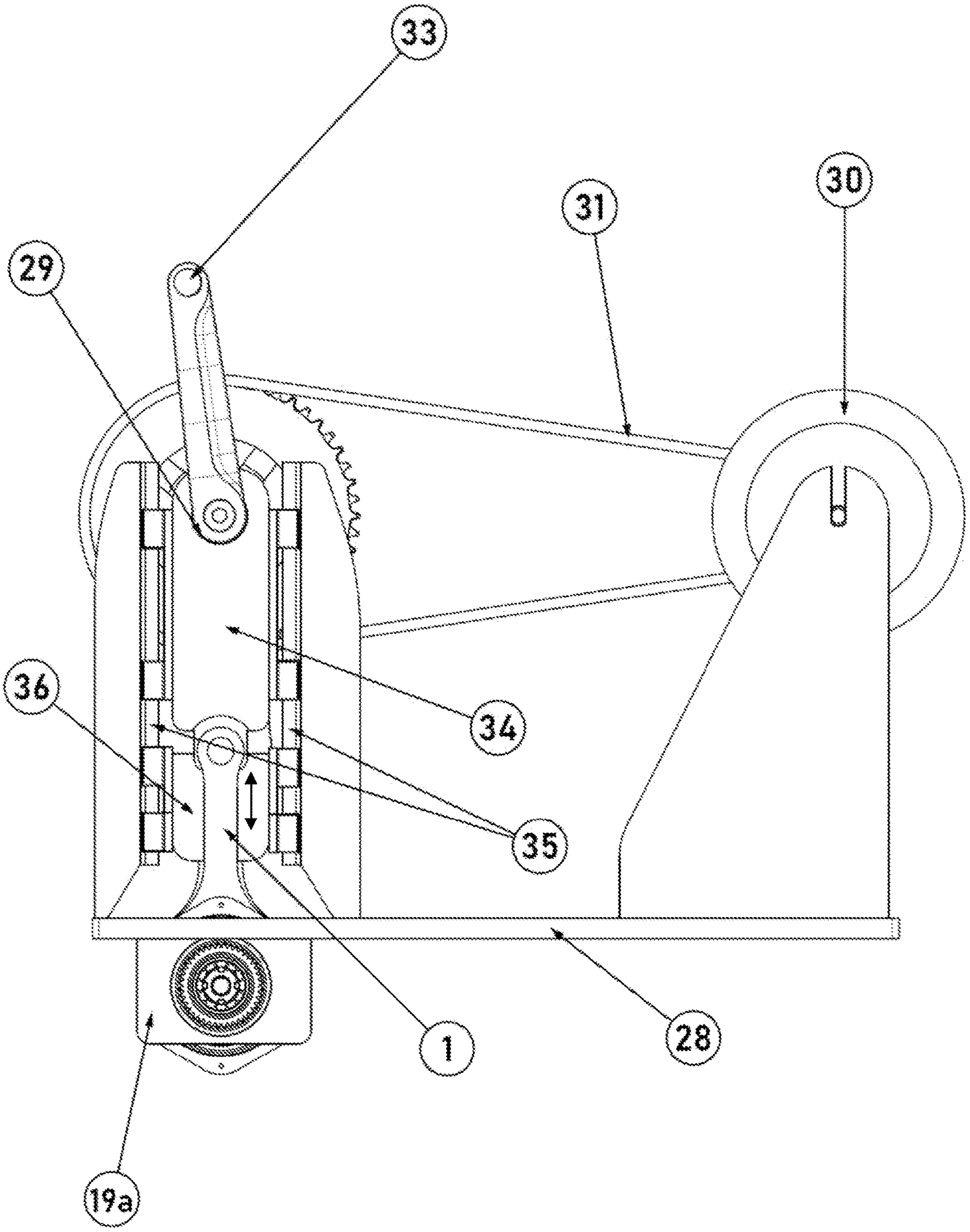
FIG. 8 shows a lateral view of the embodiment according to FIG. 7*b*)

A first possibility, which is illustrated in a lateral view in FIG. 7*b* and also in FIG. 8, lies in that the vibration unit is disposed below a floor plate 28 such that the con rod 1 passes upward through this floor plate in a vertical direction through a recess in this floor plate. The bottom bracket bearing 29 of the ergometer is selectively mounted so as to be displaceable in the strictly vertical direction in a linear slide 34, the latter by way of a linear guide 35 being mounted on the floor plate. This linear slide 34 at the top is fixedly connected to the ball bearing 29 and at the bottom coupled to the con rod head 1*a*.

Provided in this way is a construction which selectively enables vibrations only in a strictly vertical direction, and the entire suspension and load of the vibration unit is handled by way of the front region below the bottom bracket bearing. Such a vibration unit can be combined with a customary brake 30 which is coupled by way of a force transmission element, for example a chain, a belt, a timing belt.

In this construction it is possible for a vibration unit according to the first exemplary embodiment described above to be used, i.e. with only a single con rod for the vibration at the bottom bracket bearing. However, it is also possible for a vibration unit according to the second or according to the third exemplary embodiment to be used. As is illustrated in FIG. 8, it is specifically possible for a counterweight 36 to be mounted so as to be phase-shifted by 180° in such a housing by way of a further con rod, so that the vibrations by way of the first con rod illustrated at the front in FIG. 8 are transmitted at the desired frequency and amplitude to the bottom bracket bearing, but that the vibrations in relation to the environment and in particular the floor plate 28, for example, are canceled in a manner quasi analogous to noise canceling. In practice, there are indeed significant issues in devices of this type by virtue of the artificially generated vibration. On the one hand, the artificially generated vibration leads to uncomfortable noise emissions, in particular because the floor plate, or corresponding legs connected thereto transmit the vibrations to the floor and the building etc.; however, there are also uncomfortable noise emissions as a result of the vibration of other components such as, in particular the brake, etc. Furthermore, issues arise on account of the vibration because devices of this type tend to be displaced by shaking and to quasi wander around. Last but not least, the vibrations lead to mechanical damage to the device per se and to the other components of the device, and the same applies to other devices disposed in the proximity to which the vibrations are unintentionally transmitted.

Vibrations of this type suitable for this device are typically in the range of up to 50 Hz. Low frequencies of 7-12 Hz with amplitudes in the range of up to 7-10 mm for neurostimulations, typically in a load range of approx. 100 W, have proven particularly suitable. Higher frequencies in the range from 15-25 Hz, for example, can also be used for athletes, in this instance with typically somewhat lower vibration amplitudes of up to 3-4 mm. In this instance, loads in the range of 200-300 W in terms of brake output are used. In this way, the vibrations and the amplitudes are in a range which is mechanically critical for other components, and the compensation by one or a plurality of counterweights is enormously important.

The crank bearing in FIG. 7*b* is thus fastened to a linear bearing 35 by way of a slide 34, wherein the linear bearing 35 is disposed perpendicularly to the floor plate 28. The con rod is connected to the linear slide such that a movement which is directed exclusively perpendicularly to the floor plate 28 results. The construction can likewise be implemented in an oscillating-compensating manner by way of a second con rod and a counterweight 36 as the second slide on the linear guide.

A further possibility of providing such a vibration device on an ergometer is illustrated in FIG. 7*a*. Here too, a vibration which substantially runs strictly in the vertical direction is generated by the con rod 1 (cf. arrow). However, the con rod 1 serves as the sole mounting for the bottom bracket bearing in the vertical direction, so that an extremely slender construction is provided. In order for this construction to be made possible, there is now additionally a swing arm 32. This swing arm 32 is a second mounting of the bottom bracket bearing substantially about the axle 45 of the brake. The swing arm 32 possesses two arms 46, a first arm 46' and a second arm 46". The two arms engage on the axle 45 at different ends of this axle and pivotally mount the bottom bracket bearing 29. By virtue of the fact that the axle of the bottom bracket bearing 29 and the axle of the brake 45 are disposed approximately at the same level, it is thus ensured that the swing arm 32 enables a mobility of the bottom bracket bearing 29 at the bottom bracket bearing in substantially only the vertical direction such that the strictly vertical vibration is ensured. If the brake is disposed, for example, closer to the floor plate or substantially below the bottom bracket bearing in such an ergometer, the swing arm 32 should not be fitted to the axle of the brake but to a separate axial bearing approximately at the level of the bottom bracket bearing, precisely so as to ensure that only vertical vibrations are possible on the bottom bracket bearing.

In FIG. 7*a*, the center of the con rod head 1*a* is identical to the center of the crank bearing. The crank bearing is mounted only by the con rod and the swing arm. Here, all forces except for those in the direction of the con rod are absorbed by the swing arm. The adjustable braking force of the brake 30 is transmitted to the crank 33 by way of the force transmission element 31. The braking effect can be adapted by suitable measures which are known to the person skilled in the art, such as translations between the crankshaft and the brake, for example.

Figure 9B:
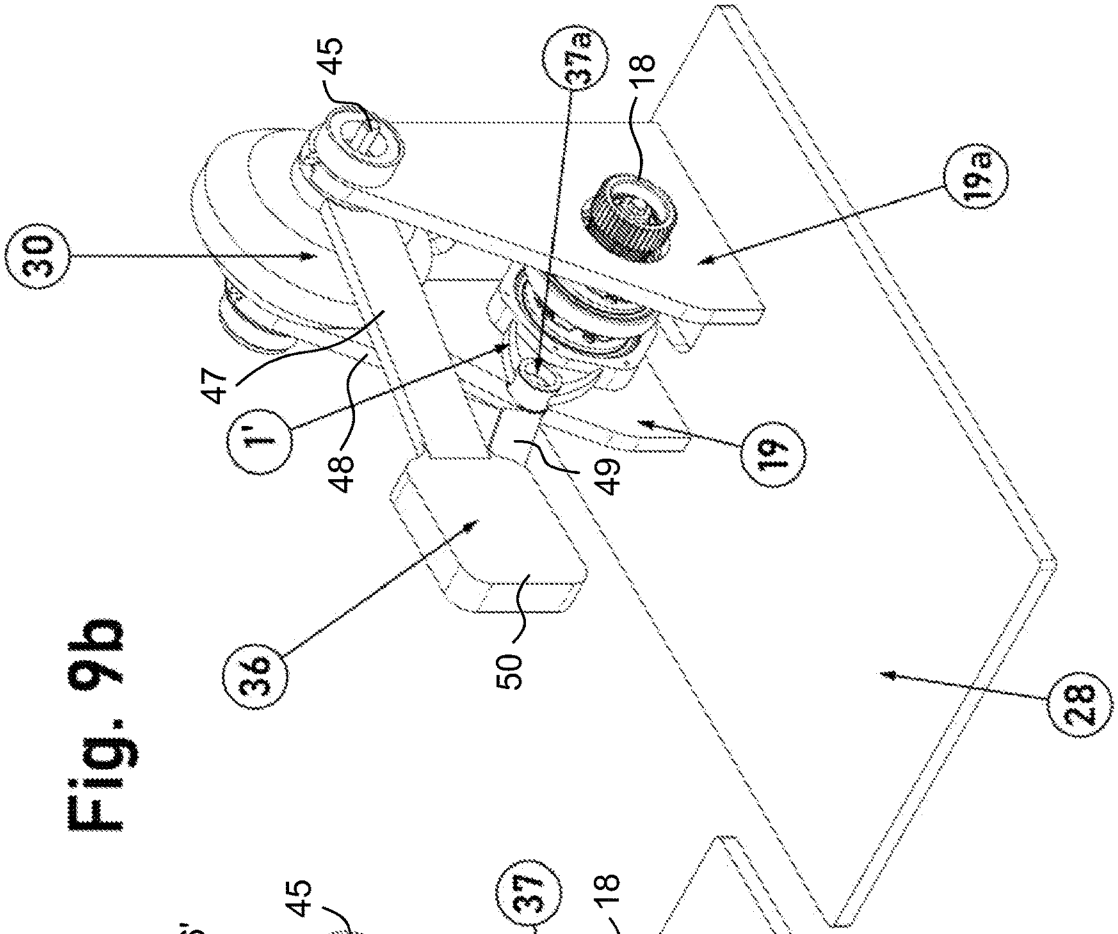
FIGS. 9*a* and 9*b* show views of an embodiment according to FIG. 7*c*, wherein illustrated in a) for the sake of improved clarity of the individual elements is the suspension without a counterweight, and illustrated in b) is only the counterweight.
Figure 9A:
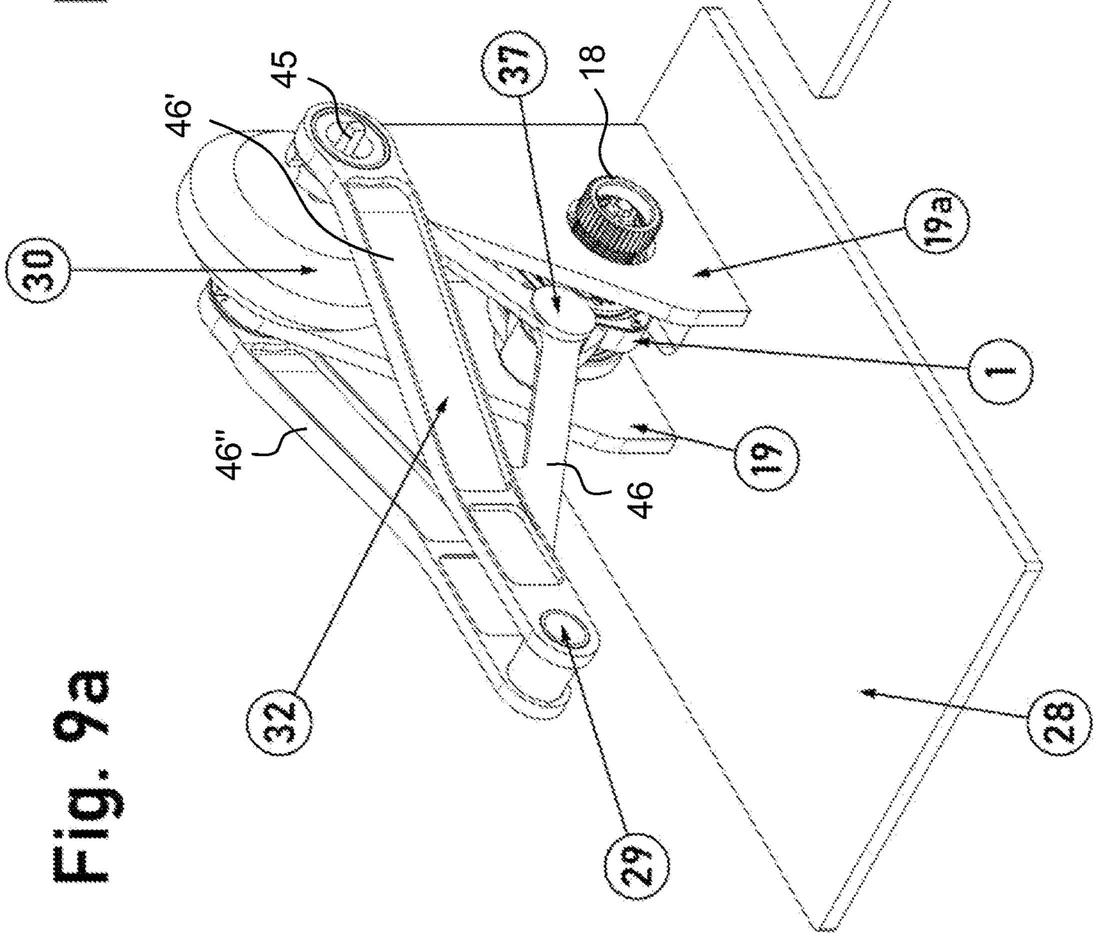
Figure 10:
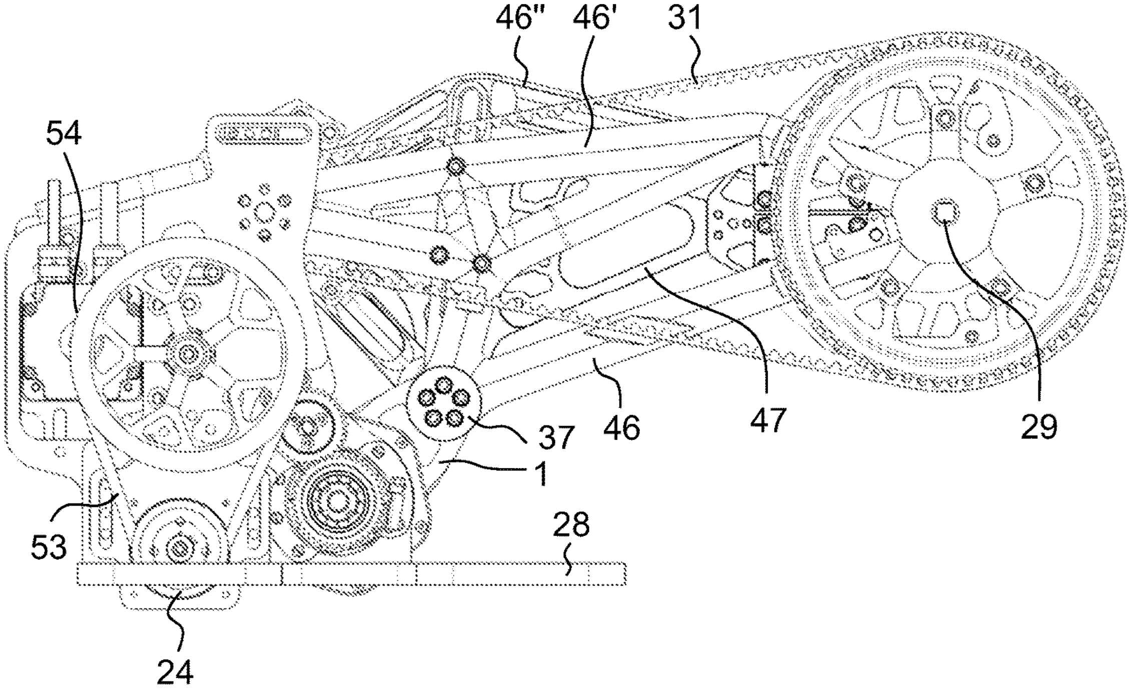
FIG. 10*a* to 10*f* show different views of a further embodiment having the vibration unit coupled to the swing arm, and a counterweight, wherein illustrated in a) is the right-hand lateral view, in b) the left-hand lateral view, in c) the view from above, in d) an exploded drawing, in e) a view from obliquely above on the right, and in f) a view from obliquely below on the right.
Figure 10:
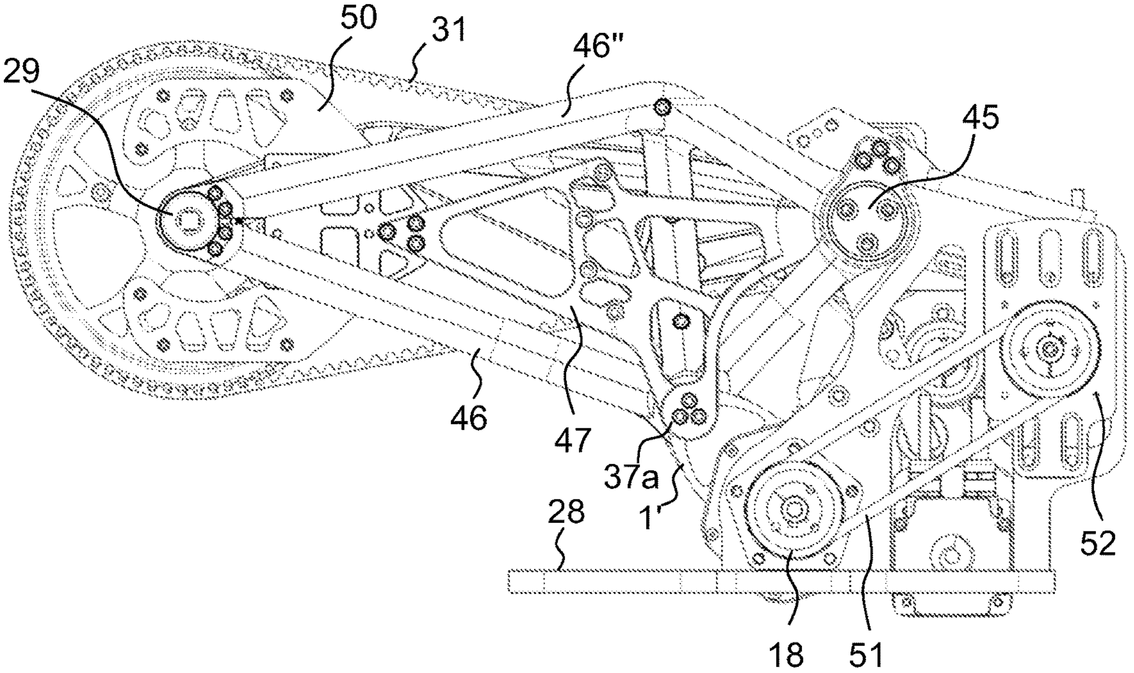
Figure 10:
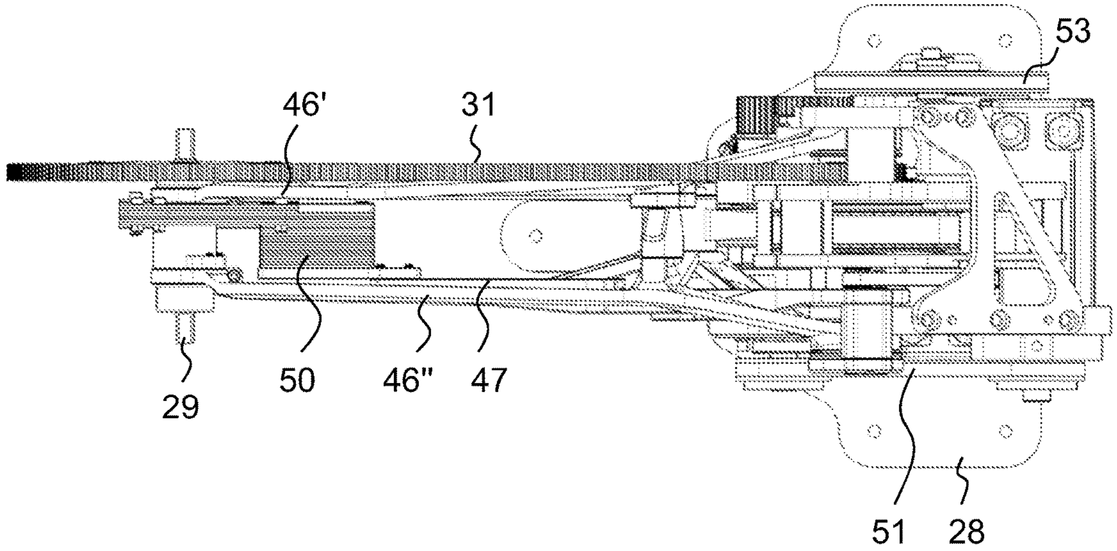
Figure 10:
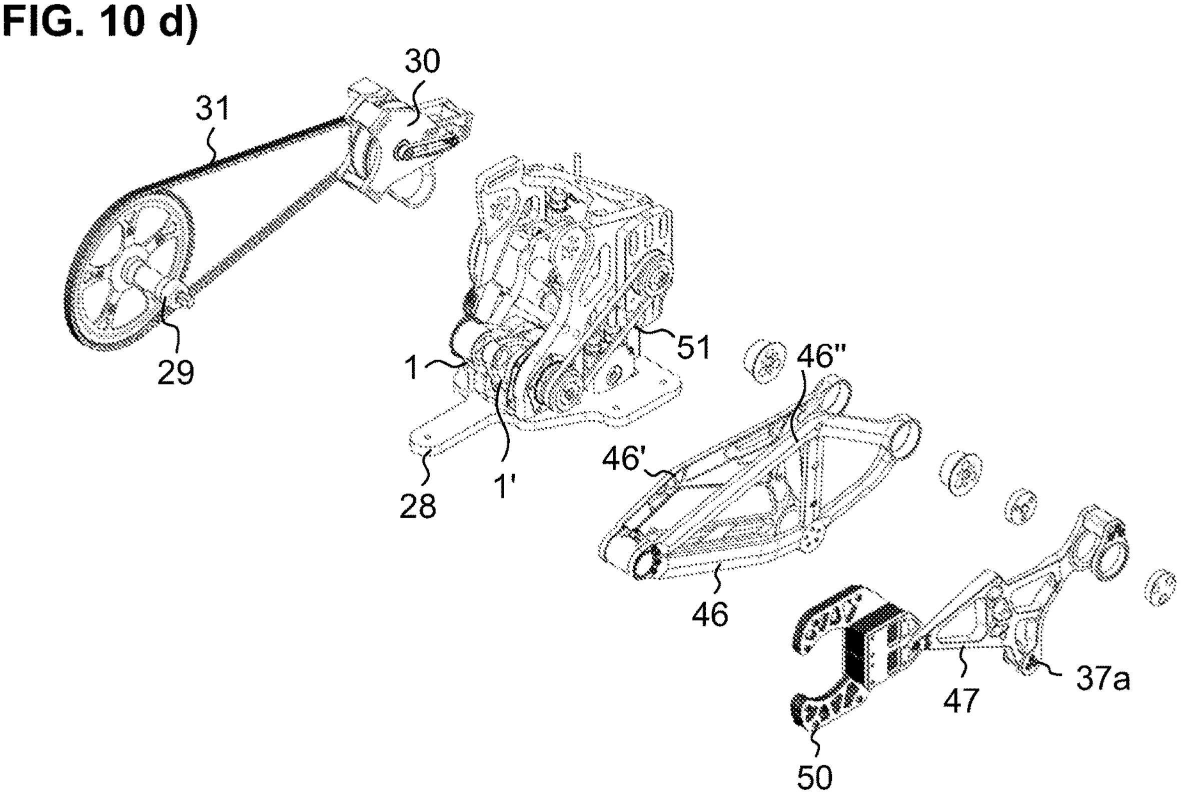
Figure 10:
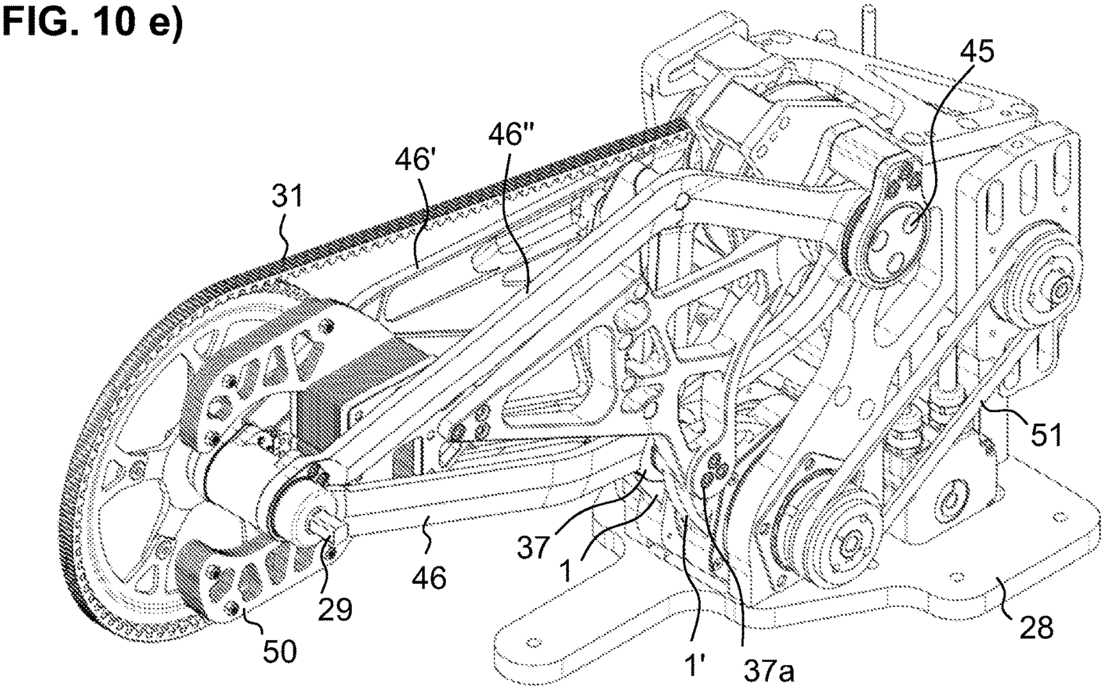
Figure 10:
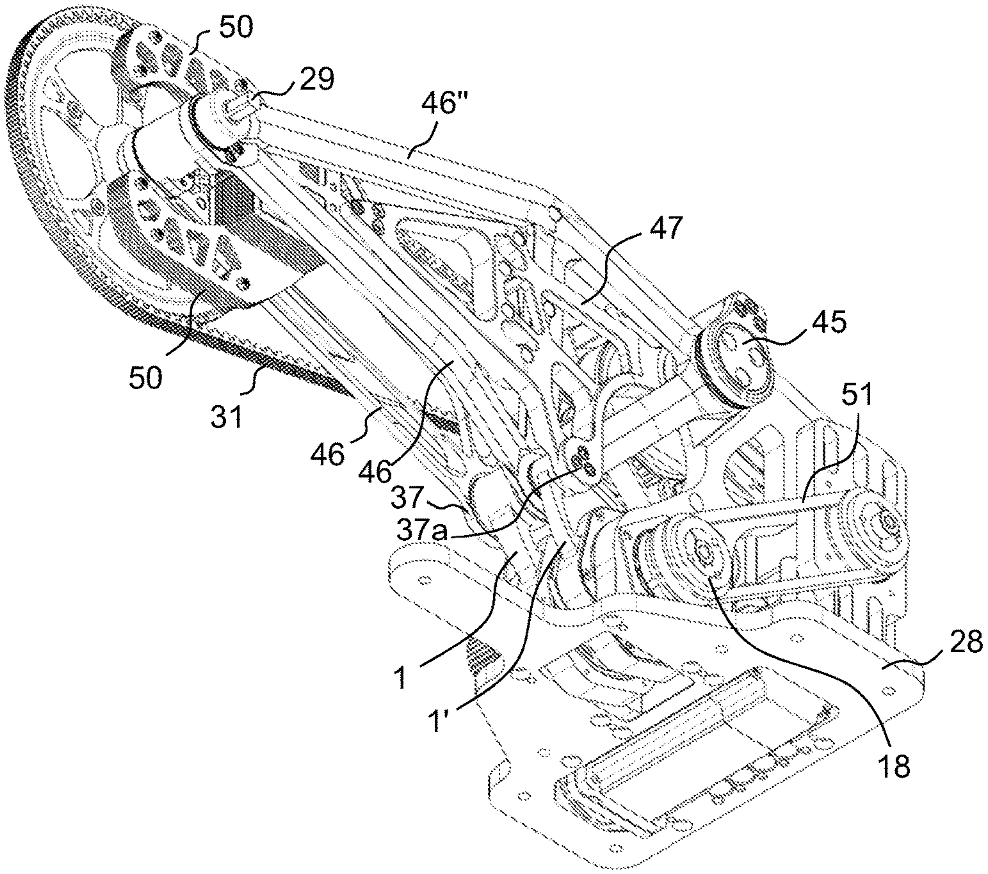

A further possibility of providing such a vibration device on an ergometer is illustrated in FIG. 7*c*. Here, the vibration device is disposed below the brake, and the bottom bracket bearing is quasi-free-floating. A particularly compact and elegant construction mode is thus created. The swing arm 32 is again fitted to the axle 45 of the brake and mounts the bottom bracket bearing 29 such that the latter can only be moved in the vertical direction. The bottom bracket bearing 29 in this construction is supported in the vertical direction only in that the swing arm 32 has a strut which is directed obliquely downward toward the vibration device and by way of a con rod receptacle 37 is coupled to one of the two con rods of the vibration device. In other words, the swing arm 32 comprises a means for coupling the vibration of the vibration device, and it is ensured by the geometric design and the levers used that the vibration at the bottom bracket bearing is converted to a strictly vertical vibration, despite said vibration on the device bearing on the con rod in an oblique direction. Cf. in this regard in particular also FIG. 9*a* in which this construction is illustrated, wherein only the swing arm 32 with the strut 46 is illustrated for improved clarity.

FIG. 7*c* thus shows a variant in which the oscillation drive is disposed not below the ball bearing but outside the crank region. As a result, components below the crankshaft are dispensed with and a very compact construction mode is thus possible. The con rod is movably connected to the swing arm at the con rod receptacle 37 of the swing arm.

In such a construction, a corresponding counterweight 36 is advantageously mounted in a very similar manner and actuated by the second con rod which is phase-shifted by 180°. Cf. in this regard in particular FIG. 9*b* in which this construction of the counterweight is illustrated and the swing arm for the bottom bracket bearing is omitted. The counterweight 36, or rather the weight head 50 of the counterweight, in this case is fitted to the axle 45 of the brake in a similar manner as the swing arm by way of a first strut 47. On the other side, there is a further strut 49 between the weight head 50 and a con rod receptacle 37*a* for the counterweight, said strut 49 being directed downward, and a third strut 48 which fits the con rod receptacle of the counterweight to the axle 45 of the brake so as to guarantee the required stability of the mounting. The counterweight, in particular the weight head 50 thereof, is thus disposed in a manner mounted in an optimal space-saving manner and nevertheless in a protruding manner between the two arms 46' and 46" of the swing arm, and can there also provide the optimal compensation effect.

Illustrated in FIG. 10*a* to 10*f* is a further exemplary embodiment of an ergometer. The components corresponding to the components described above are provided with the same reference signs. In this exemplary embodiment, the swing arm is designed with a plurality of struts on both sides, inter alia also with additional vertical struts and horizontal struts. In principle however, the attachment to the con rod 1 is analogous to that as described further above in the context of FIGS. 7 and 9. The counterweight is also mounted in a similar way; the weight head 50 here is constructed as a layered body which makes it possible for the mass of the weight head to be optionally adapted on-site in that further layers are added. Furthermore, the weight head 50 is configured as a fork, so to speak, the arms of the latter at least partially encompassing the bottom bracket bearing 29 at the top and the bottom. In this way, the counterweight can be disposed ideally close to the bottom bracket bearing and in the region of the latter, such that the compensation of the vibration can take place in an optimal manner. The counterweight here is mounted by way of a mounting body 47, which is likewise configured with a plurality of struts, and is again coupled to the vibration unit by way of the con rod receptacle 37*a* for the counterweight. This mounting body in a certain sense penetrates struts of the swing arm and is thus mounted in an optimal, space-saving and compact manner.

Likewise to be seen in this exemplary embodiment is the actuator 52 with the assigned V-belt 51 for the adjustment of the trapezoidal thread nut, and correspondingly for the adjustment of the eccentricity and the associated amplitude of the vibration. The motor 54 for the drive of the main shaft 12, and the corresponding V-belt 53, can likewise be seen.

LIST OF REFERENCE SIGNS

1 Con rod
1' Con rod for counterweight
1*a* Con rod head
2 Screws
3 Bearing ring
4 Ball bearing
5 Sliding block
6 Eccentric disk
6' Eccentric disk for counterweight
7 Fitting screws
8 Clamping ring
9 Shell sleeves
10 Screws
11 Bearing assembly
12 Main shaft
12*a* Shoulder face
12*b* Sliding face
13 Adjustment element
13*a* Cut-out area
14 Fitting screws
15 Bearing receptacle
16 Bearing assembly
17 Trapezoidal thread nut
18 Trapezoidal spindle
19 Left bearing housing
19*a* Right bearing housing
20 Shaft clamping nut
21 Locking ring
22 Shaft clamping nut
23 Locking ring
24 V-belt pulley
25 Clamping nut head
26 Con rod head bearing
27 Con rod head bearing
28 Floor plate
29 Crank bearing
30 Brake
31 Force transmission element
32 Swing arm
33 Crank
34 Linear slide
35 Linear guide
36 Counterweight
37 Con rod receptacle swing arm
37*a* Con rod receptacle counterweight
38 Axial blind bore in 12
39 Radial through-opening
40 Fastening region of 12
41 Contact faces of 6 on 9
42 Contact faces of 9 on 12*b*
43 Recess in 6
44 Recess in 28 for 1
45 Axle of the brake
46 Strut of 32
46', 46" Arms of 32
47 Weighted strut to the axle of the brake
48 Weighted strut from the axle of the brake to the con rod receptacle of the counterweight
49 Weighted strut from the con rod receptacle of the counterweight to the weight head
50 Weight head
51 V-belt for activating the trapezoidal thread nut
52 Motor for activating the trapezoidal thread nut by way of 51
53 V-belt for the drive motor of main shaft 12
54 Motor for driving main shaft 12

The invention claimed is:

1. An ergometer, comprising:

at least one pedal device for a user, and having a vibration unit;

wherein a bearing of the pedal device is mounted so as to be pivotable about a horizontal swivel axle, wherein a horizontal swivel axle mounting of the bearing is defined by a substantially fork-shaped construction.

2. The ergometer as claimed in claim 1, wherein a brake is disposed substantially at the same height level as the pedal device, which the brake by way of a force transmission element is coupled to the pedal device, and wherein the bearing of the pedal device is mounted so as to be pivotable about the horizontal swivel axle disposed at the level of an axle of the brake.

3. The ergometer as claimed in claim 2, wherein the vibration unit has at least one main shaft which is driven directly or indirectly by a motor and which has an eccentric disk fastened thereto, wherein the eccentric disk is rotatably coupled to a con rod, and wherein the vibration unit is disposed below the brake.

4. The ergometer as claimed in claim 2, wherein the vibration unit has at least one main shaft which is driven directly or indirectly by a motor and which has an eccentric disk fastened thereto, wherein the eccentric disk is rotatably coupled to a con rod, and wherein the vibration unit is disposed below the brake, above a floor plate, and wherein the coupling of the con rod to the bearing is implemented by at least one strut which runs obliquely upward and connects the con rod head directly or indirectly to the bearing, and wherein this strut is furthermore rigidly connected to the swivel axle mounting.

5. The ergometer as claimed in claim 1, wherein the ergometer is mounted on a base plate which acts as a mechanical high-pass filter for the vibrations generated by the vibration unit, and/or wherein the vibration unit has at least one main shaft which is driven directly or indirectly by a motor and which has an eccentric disk fastened thereto, wherein the eccentric disk is rotatably coupled to a con rod, and a further eccentric disk by way of which a counterweight is set in a compensating vibration is disposed on the main shaft.

6. The ergometer as claimed in claim 5, wherein a brake is disposed, which brake by way of a force transmission element is coupled to the pedal device, and the counterweight is mounted so as to be pivotable about the horizontal swivel axle mounting.

7. The ergometer as claimed in claim 5, wherein a brake is disposed substantially at the same level as the pedal device, which brake by way of a force transmission element, in the form of a chain, or of a timing belt or of a V-belt, is coupled to the pedal device, and the counterweight is mounted so as to be pivotable about the horizontal swivel axle mounting disposed at the level of an axle of the brake, wherein the swivel axle is disposed such that the counterweight in a region of the bearing performs a pivoting movement exclusively in the vertical direction, wherein the counterweight in the region of the bearing has a weight head, and this weight head at least partially encompasses the bearing region at the top and the bottom in the shape of a fork.

8. The ergometer as claimed in claim 1, wherein the vibration unit has at least one main shaft which is driven directly or indirectly by a motor and which has an eccentric disk fastened thereto, wherein the eccentric disk is rotatably coupled to a con rod, and the eccentric disk and/or an optionally present further eccentric disk are/is mounted on the main shaft so as to be displaceable and adjustable along a direction perpendicular to a rotation axis of the main shaft.

9. The ergometer as claimed in claim 8, wherein the at least one adjustment element is mounted in a recess or through-opening in the main shaft so as to be adjustably displaceable by way of actuating means, and a gate in or on the adjustment element adjusts the eccentricity of the eccentric disk by interacting with a sliding block on the eccentric disk.

10. The ergometer as claimed in claim 8, wherein an eccentric disk for generating the desired vibration, and a further eccentric disk for the counterweight, are mounted on the main shaft, and in that either an adjustment element by way of which the eccentricity of both eccentric disks can be adjusted in a correlated manner so as to be offset by 180° is provided, or in that two individual adjustment elements by way of which the eccentricity of the disks can be individually adjusted are provided for the respective eccentric disk.

11. A method of using an ergometer as claimed in claim 1 for therapeutic and/or form-building therapy, wherein frequencies at the bearing are adjusted in the range from 5-50 Hz, and/or with amplitudes in the range from 1-10 mm.

12. The method as claimed in claim 11, wherein frequencies at the bearing are adjusted in the range from 7-25 Hz, and/or with amplitudes in the range from 3-7 mm.

13. The ergometer as claimed in claim 1, wherein the swivel axle is disposed in such a manner that a pivoting movement at a location of the bearing is permitted exclusively in a vertical direction.

14. The ergometer as claimed in claim 1, wherein said ergometer is conceived for the operation at a frequency of 1-50 Hz with a vibration amplitude at the bearing in the range from 1-10 mm, or at a load in the range from 50-500 W.

15. The ergometer as claimed in claim 1, wherein it is a bicycle ergometer.

16. The ergometer as claimed in claim 1, wherein a brake is disposed substantially at the same level as the pedal device, which brake by way of a force transmission element, in the form of a chain, or of a timing belt or of a V-belt, is coupled to the pedal device, and wherein the bearing of the pedal device is mounted so as to be pivotable about the horizontal swivel axle disposed at the level of an axle of the brake, wherein the swivel axle is disposed horizontally.

17. The ergometer as claimed in claim 1, wherein the swivel axle mounting of the bearing is defined by the substantially fork-shaped construction in which the fork ends of the arms are mounted so as to be rotatable about the swivel axle, and opposite converged arms are connected to the bearing, in that a converged region forms a bearing receptacle for the bearing of the pedal device.

18. The ergometer as claimed in claim 1, wherein the vibration unit has at least one main shaft which is driven directly or indirectly by a motor and which has an eccentric disk fastened thereto, wherein the eccentric disk is rotatably coupled to a con rod, and wherein the vibration unit is disposed below the bearing, and wherein the con rod head is coupled directly to the bearing, in that it forms a bearing shell for the bearing, and wherein the con rod solely and without any further guide supports substantially the entire load directed vertically downward on the bearing, wherein an axis of the main shaft runs parallel to an axis of the bearing, or wherein the bearing of the pedal device is mounted in a vertical linear guide having a linear slide, wherein the linear slide at the top is fixedly connected to the bearing, and at the bottom is connected to the con rod head, wherein the axis of an main shaft runs parallel to an axis of the bearing.

19. The ergometer as claimed in claim 1, wherein the ergometer is mounted on a base plate which acts as a mechanical high-pass filter for the vibrations generated by the vibration unit, and/or wherein the vibration unit has at least one main shaft which is driven directly or indirectly by a motor and which has an eccentric disk fastened thereto, wherein the eccentric disk is rotatably coupled to a con rod, and a further eccentric disk by way of which a counterweight is set in a compensating vibration is disposed on the main shaft, wherein this further eccentric disk is disposed on the main shaft by way of eccentricity which is counter to the eccentric disk for driving the con rod, wherein the further eccentric disk drives a further con rod which is rotatably mounted on the further eccentric disk and is coupled to a counterweight which is set in vibration substantially in the same direction as the vibration device on the bearing but with an action compensating the vibration on the bearing, in that the vibration on the counterweight is offset by 180° in relation to the vibration on the bearing.

20. The ergometer as claimed in claim 1, wherein the vibration unit has at least one main shaft which is driven directly or indirectly by a motor and which has an eccentric disk fastened thereto, wherein the eccentric disk is rotatably coupled to a con rod, and the eccentric disk and/or an optionally present further eccentric disk are/is mounted on the main shaft so as to be displaceable and adjustable along a direction perpendicular to the rotation axis of the main shaft, wherein this mounting is implemented by a gate guide in which at least one adjustment element when displaced along an axis of the main shaft causes a displacement of the eccentric disk along a direction perpendicular to a rotation axis of the main shaft.

21. The ergometer as claimed in claim 1, wherein said ergometer is conceived for the operation at a frequency of 1-50 Hz with a vibration amplitude at the bearing in the range from 3-7 mm, or at a load in the range from 100-300 W.

22. An ergometer, comprising:

at least one pedal device for a user, and having a vibration unit;

wherein a bearing of the pedal device is mounted so as to be pivotable about a horizontal swivel axle, wherein the vibration unit has at least one main shaft which is driven directly or indirectly by a motor and which has an eccentric disk fastened thereto, wherein the eccentric disk is rotatably coupled to a con rod, and wherein the vibration unit is disposed below the bearing, and wherein the con rod head is coupled directly to the bearing and wherein the con rod solely and without any further guide supports substantially the entire load directed vertically downward on the bearing, or wherein the bearing of the pedal device is mounted in a vertical linear guide having a linear slide, wherein the linear slide at the top is fixedly connected to the bearing, and at the bottom is connected to the con rod head.

23. The ergometer as claimed in claim 22, wherein a floor plate is disposed, the main shaft being disposed therebelow and the pedal device being disposed thereabove, wherein provided in the floor plate is a recess through which the con rod passes and by way of which the con rod head thereof is coupled directly to the bearing.

24. The ergometer as claimed in claim 22, wherein a floor plate is disposed, the main shaft and also the motor being disposed therebelow and the pedal device being disposed thereabove, wherein provided in the floor plate is a recess through which the con rod passes and by way of which the con rod head thereof is coupled directly to the bearing.

25. An ergometer, comprising:

at least one pedal device for a user, and having a vibration unit;

wherein a bearing of the pedal device is mounted so as to be pivotable about a horizontal swivel axle, wherein the vibration unit has at least one main shaft which is driven directly or indirectly by a motor and which has an eccentric disk fastened thereto, wherein the eccentric disk is rotatably coupled to a con rod, and wherein the con rod by way of a con rod head disposed opposite one of the eccentric disk thereof transmits the vibrations to the bearing of the pedal device such that the vibrations bear on this bearing substantially exclusively in a vertical direction.

* * * * *